(12) United States Patent
Kang et al.

(10) Patent No.: US 12,439,250 B2
(45) Date of Patent: Oct. 7, 2025

(54) METHOD AND APPARATUS FOR TRANSFERRING NETWORK ACCESS INFORMATION BETWEEN TERMINALS IN MOBILE COMMUNICATION SYSTEM

(71) Applicant: Samsung Electronics Co., Ltd., Suwon-si (KR)

(72) Inventors: Sujung Kang, Suwon-si (KR); Duckey Lee, Suwon-si (KR); Hyewon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 451 days.

(21) Appl. No.: 17/999,759

(22) PCT Filed: May 31, 2021

(86) PCT No.: PCT/KR2021/006757
§ 371 (c)(1),
(2) Date: Nov. 23, 2022

(87) PCT Pub. No.: WO2021/242071
PCT Pub. Date: Dec. 2, 2021

(65) Prior Publication Data
US 2023/0209340 A1 Jun. 29, 2023

(30) Foreign Application Priority Data

May 29, 2020 (KR) .................. 10-2020-0064948
Aug. 19, 2020 (KR) .................. 10-2020-0103768

(51) Int. Cl.
*H04W 12/06* (2021.01)
*H04W 12/0431* (2021.01)

(52) U.S. Cl.
CPC ....... *H04W 12/06* (2013.01); *H04W 12/0431* (2021.01)

(58) Field of Classification Search
CPC . H04W 12/06; H04W 12/0431; H04W 12/42; H04W 12/43; H04W 8/20
See application file for complete search history.

(56) References Cited

U.S. PATENT DOCUMENTS 9,706,407 B2 7/2017 Seo et al.
10,701,550 B2 6/2020 Park et al.
(Continued)

FOREIGN PATENT DOCUMENTS

CN 111107543 A 5/2020
IN 201937050075 2/2020
(Continued)

OTHER PUBLICATIONS

International Search Report and Written Opinion of the International Searching Authority dated Aug. 26, 2021, in connection with International Application No. PCT/KR2021/006757, 8 pages.
(Continued)

*Primary Examiner* — Diane D Mizrahi

(57) ABSTRACT

The present disclosure relates to: a communication technique merging IoT technology with a 5G communication system for supporting a data transmission rate higher than that of a 4G system; and a system therefor. The present disclosure may be applied to intelligent services (for example, smart homes, smart buildings, smart cities, smart cars or connected cars, healthcare, digital education, retail business, security- and safety-related services, and the like) on the basis of 5G communication technologies and IoT-related technologies. The present invention proposes a method and an apparatus for enabling convenient device-to-device communication service movement by combining a user's device transfer start terminal and an operator support method even if the user starts a device transfer from any terminal when moving a profile between devices. In particular, according to one embodiment of the present invention
(Continued)

tion, it is possible to provide a method comprising the steps of: receiving an input for moving a first profile installed in a first terminal; determining, in the first terminal, that a communication service provider's device transfer method is an ODSA method by checking profile metadata, a configuration server, or a terminal memory; determining, by ECS, an ECS/DP+ authentication method as a subscriber authentication method for the device transfer, and performing transmission together with ECS generation nonce and SM-DP+ address to the terminal; receiving, by the ECS, authentication result data processed by SM-DP+ from the first terminal, and verifying ECS-generated and delivered nonce included in the data and signature data of an SM-DP+ server through a GSMA Root CI certificate; and if verified, providing an activation code to the terminal and displaying a QR code on the screen of the first terminal.

12 Claims, 12 Drawing Sheets

(56) References Cited

U.S. PATENT DOCUMENTS

| | | |
|---|---|---|
| 10,924,921 B2 | 2/2021 | Jin et al. |
| 11,395,132 B2* | 7/2022 | Lee .................. H04W 8/18 |
| 2016/0212617 A1 | 7/2016 | Koshimizu et al. |
| 2016/0249214 A1 | 8/2016 | Li et al. |
| 2018/0146365 A1 | 5/2018 | Dhanapal et al. |
| 2018/0324672 A1 | 11/2018 | Kang et al. |
| 2019/0174314 A1 | 6/2019 | Joseph et al. |
| 2019/0253884 A1 | 8/2019 | Fan et al. |
| 2020/0045541 A1 | 2/2020 | Kreishan |
| 2020/0045544 A1 | 2/2020 | Yu et al. |
| 2020/0084610 A1 | 3/2020 | Salmela et al. |
| 2022/0078615 A1 | 3/2022 | Lee et al. |

FOREIGN PATENT DOCUMENTS

| | | |
|---|---|---|
| KR | 10-2014-0064601 A | 5/2014 |
| KR | 10-2016-0115048 A | 10/2016 |
| KR | 10-2020-0101257 A | 8/2020 |

OTHER PUBLICATIONS

Supplementary European Search Report dated Oct. 5, 2023, in connection with European Application No. 21814202.4, 16 pages.
GSM Association, "Service Entitlement Configuration," Version 6.1, Official Document TS.43, Apr. 2021, 103 pages.
Notification of the First Office Action dated Oct. 18, 2024, in connection with Chinese Application No. 202180039118.3, 12 pages.
Notice of Grant of Invention Patent Right and Search Report mailed Mar. 27, 2025, in connection with Chinese Application No. 202180039118.3, 8 pages.

* cited by examiner

| User start terminal \ Provider support method | ODSA | LPA |
|---|---|---|
| Second terminal | ✓ | FAIL |
| First terminal | FAIL | ✓ |

To-Be — 210

| User start terminal \ Provider support method | ODSA | LPA |
|---|---|---|
| Second terminal | ✓ | Support |
| First terminal | Support | ✓ |

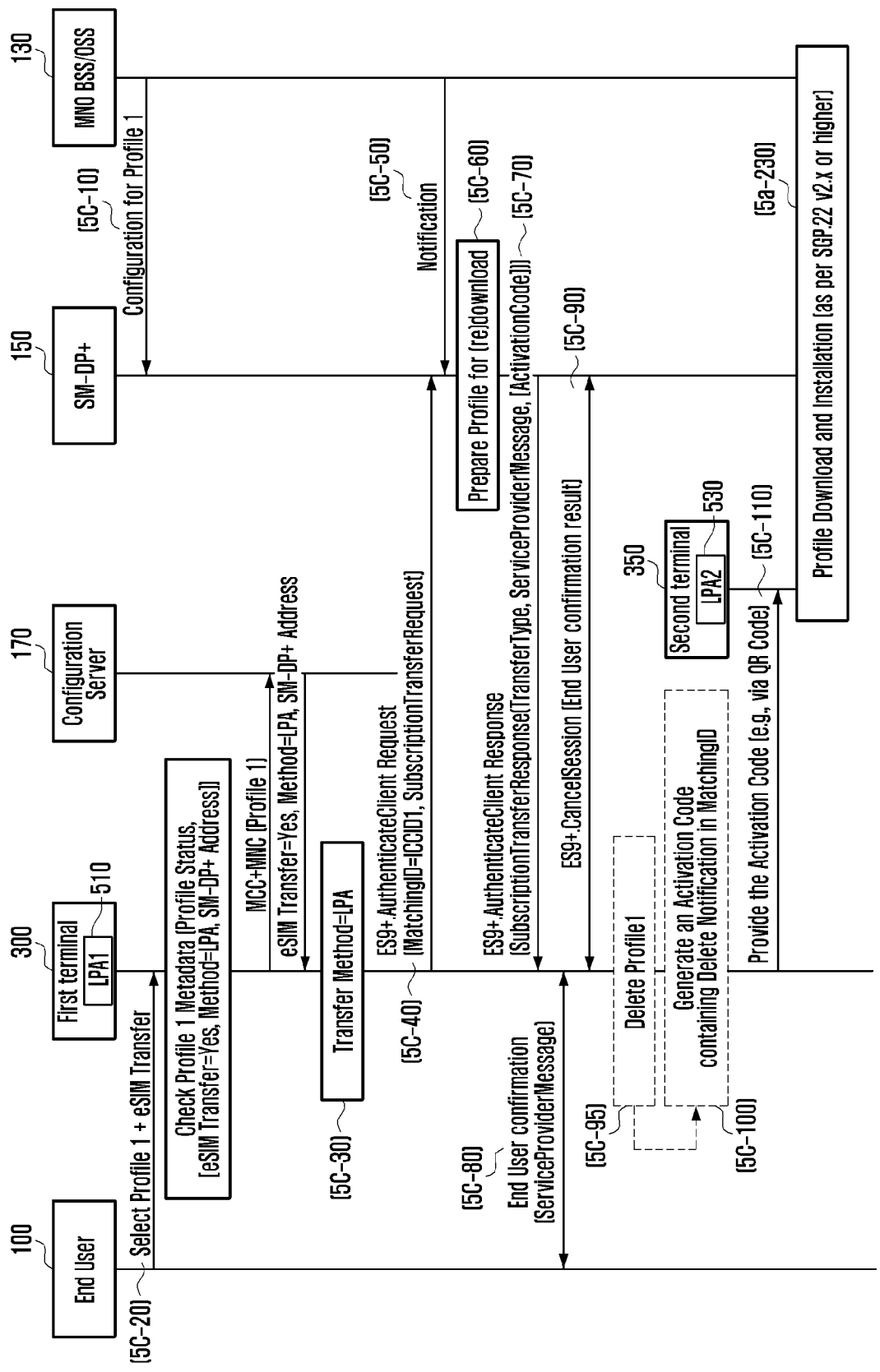

METHOD AND APPARATUS FOR TRANSFERRING NETWORK ACCESS INFORMATION BETWEEN TERMINALS IN MOBILE COMMUNICATION SYSTEM

CROSS-REFERENCE TO RELATED APPLICATIONS

This application is a 371 National Stage of International Application No. PCT/KR2021/006757, filed May 31, 2021, which claims priority to Korean Patent Application No. 10-2020-0064948, filed May 29, 2020, and Korean Patent Application No. 10-2020-0103768, filed Aug. 19, 2020, the disclosures of which are herein incorporated by reference in their entirety.

BACKGROUND

1. Field

The disclosure relates to a method and apparatus for transferring and reinstalling access information for accessing a communication system installed in one device to another device in a wireless communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

A universal integrated circuit card (UICC) is a smart card inserted and used in a mobile communication terminal and is also referred to as a UICC card. The UICC may include an access control module for accessing a network of a mobile communication service provider. Examples of the access control module include a universal subscriber identity module (USIM), a subscriber identity module (SIM), and an IP multimedia service identity module (ISIM). A UICC including a USIM is commonly referred to as a USIM card. Similarly, a UICC including a SIM module is commonly referred to as a SIM card. In the following description of the disclosure, the term "SIM card" will be used in a general sense including a UICC card, a USIM card, a UICC including an ISIM, and the like. That is, the technical application of the SIM card may be equally applied even to a USIM card, an ISIM card, or a general UICC card.

The SIM card stores personal information of a mobile communication subscriber, and performs subscriber authentication and traffic security key generation when accessing a mobile communication network, thereby enabling safe mobile communication use.

The SIM card is generally produced as a dedicated card for a corresponding provider by the request of a specific mobile communication service provider upon producing a card, and authentication information, for example, a universal subscriber identity module (USIM) application and international mobile subscriber identity (IMSI), K value, OPc value, and the like for network access of the provider are loaded in advance in the card, and the card is launched. Accordingly, the produced SIM card is transferred to the corresponding mobile communication service provider and provided to a subscriber, and then, if necessary, management of installation, modification, and deletion of applications in the UICC may be performed using technologies such as over the air (OTA). Subscribers may insert the UICC card into a mobile communication terminal thereof to use the network and application services of the mobile communication service provider, and when replacing the terminal, by moving and inserting the UICC card from an existing terminal to a new terminal, the subscribers may use authentication information, mobile communication phone number, personal phone book, and the like stored in the UICC card as it is in the new terminal.

However, the SIM card is inconvenient for a mobile communication terminal user to receive services from other mobile communication companies. The mobile communication terminal user is inconvenient to physically acquire a SIM card in order to receive a service from a mobile communication service provider. For example, when traveling to another country, it is inconvenient for the user to acquire a local SIM card in order to receive a local mobile communication service. A roaming service solves to some extent the above inconvenience, but there is a problem that the service cannot be provided in the case that a contract between communication companies is not made and an expensive fee.

In the case that the SIM module is remotely downloaded and installed in the UICC card, such inconvenience may be largely solved. That is, a SIM module of a mobile communication service that the user wants to use at a desired time point may be downloaded to the UICC card. Such a UICC card may download and install a plurality of SIM modules and select and use only one SIM module of the plurality of SIM modules. Such a UICC card may or may not be fixed to the terminal. In particular, a UICC fixed to and used in a terminal is referred to as an embedded UICC (eUICC), and the eUICC commonly means a UICC card fixed to and used in the terminal and that may be selected by remotely downloading a SIM module. In the disclosure, a UICC card that may remotely download and select a SIM module will be collectively referred to as an eUICC. That is, among UICC cards that may remotely download and select a SIM module, a UICC card fixed or not fixed to the terminal will be collectively referred to as an eUICC. Further, downloaded SIM module information will be collectively referred to as the term eSIM profile. That is, among UICC cards that may remotely download and select a SIM module, a UICC card fixed to a terminal and a UICC card that is not fixed to a terminal are collectively referred to as an eUICC. Further, downloaded SIM module information will be collectively referred to as the term profile.

In order to fully utilize the advantage of downloading the SIM module of the mobile communication service to the UICC card and opening the communication service, communication service providers are introducing an on device service activation service in the terminal. On device service activation is a generic term for a solution that enables a user to subscribe and open a new communication service through a web portal or app in a terminal, or to transfer, install, and open a communication service upon changing a device. The on device service activation service may be used interchangeably with terms ODSA or ODA. Further, a module that needs to be installed in the terminal so as to support ODSA is referred to as an ODSA client, and the ODSA client may be used interchangeably with the term ODSA or ODA.

In order to determine whether a terminal or a subscriber who wants to use a specific service has the right to access or use the corresponding service, a service provider may introduce an entitlement configuration server (ECS). The ECS may determine whether a requesting terminal can provide a communication-based service in consideration of subscriber information of the terminal user and a network state of the terminal, and in the case that the requesting terminal can provide the communication-based service, the ECS may transmit predetermined information for the terminal to provide the communication-based service to the terminal. The ECS is currently being introduced for services such as voice over LTE (VoLTE), voice over Wi-Fi (VoWiFi), and on device service activation (ODSA). In the ODSA, the ECS serves as an ODSA gateway server of a provider accessed by the ODSA client of the terminal, and a message protocol between the ODSA client and the ECS is defined in the TS.43 standard by the GSM Association (GSMA). An ECS address may be expressed in various ways, but an example of the expression is full qualified domain name (FQDN), which may be created and used as in ase.mnc<MNC>.mcc<MCC>.pub.3gppnetwork.org according to the combination of MCC and MNC, which is an intrinsic identification number of a communication service provider. <MNC> and <MCC> are a decimal format of the corresponding MNC and MCC, respectively, and in the case that the corresponding information is a two-digit number, the <MNC> and <MCC> may be used as a three-digit number by adding 0 to the beginning.

When replacing a terminal, by moving and inserting the SIM card from the existing terminal to the new terminal, a communication service subscriber may use mobile communication network access as it is using authentication information stored in the UICC card. However, in the case of an eUICC-equipped terminal, a downloaded profile is decoded and installed only inside the eUICC, and after the profile is installed, the profile cannot be again extracted to the outside of the terminal, whereby it is necessary to download and (re)install a profile in a new terminal.

At a time point of disclosing the disclosure, in order to transfer and install a communication service when changing a device of an eUICC-equipped terminal, communication service providers are standardizing a method of using LPA and SM-DP+ and a method of using an ODSA client and an ECS to GSMA, and it is expected that communication service providers will select one of these methods to support transfer installation of communication services. However, according to each method, support is available only in an existing terminal (the existing terminal in which the profile is installed) or a new terminal to be changed; thus, there is inconvenience that the user cannot perform transfer installation of the communication service according to the combination of the user's start terminal and the provider's support method. This will be further described with reference to FIG. 2.

The existing mobile communication company provides a procedure of verifying an identity or ID authentication process of a subscriber when a SIM card is lost to reissue a SIM card, and the procedure may be applied to the purpose of downloading a profile to an eUICC of a new terminal when changing a device of an eUICC-equipped terminal. However, such a process is usually processed only when a subscriber visits an offline branch, or when such a process is processed online, a stricter identity authentication or ID verification process is required compared to an offline branch. When changing a terminal, in order to reinstall a profile to a new terminal, there is inconvenience that a subscriber has to go through such a strict identity authentication or ID verification process. In the case that a subscriber has an existing terminal, a communication service provider may authenticate the subscriber using an EAP-AKA method, which is a method commonly used by the communication service provider for subscriber authentication in communication services, but authentication is possible only when the SIM module is activated and access to SIM information is thus possible, and the EAP-AKA method cannot be used when the SIM module is deactivated.

SUMMARY

The technical problem to be achieved by the disclosure is to use a communication service used in an existing terminal in a communication system by transfer reinstalling/opening the communication service to a replaced new terminal. To this end, when a new eUICC profile corresponding to a profile stored in an eUICC of the existing terminal is downloaded online and installed, a device transfer method is selected in consideration of the combination of a user start terminal and a provider support method. In particular, the disclosure provides a method of supporting an ODSA method in the existing terminal and supporting an LPA method in a new terminal. Further, the disclosure provides a download method that does not require separate subscriber ID authentication, which may be provided even in the case that an SIM module is deactivated.

The technical problems to be achieved in the embodiment of the disclosure are not limited to the technical problems described above, and other technical problems not described will be clearly understood to those of ordinary skill in the art to which the disclosure belongs from the description below.

According to the disclosure for solving the above problems, a method performed by a terminal in a wireless communication system may include acquiring information related to a device transfer; determining a device transfer method based on the information related to the device transfer; transmitting, to a server, a first message including information related to authentication and an identifier of the terminal through the determined device transfer method, wherein the server transmits the first message identified based on the information related to the device transfer; and receiving, from the server, a second message including an authentication method determined by the server based on the information related to authentication and the identifier of the terminal.

In some examples, the device transfer method may be at least one of an on device service activation (ODSA) method or a local profile assistant (LPA) method.

In some examples, the information related to the device transfer may be acquired through at least one of information received by a second server, information stored in advance in the terminal, or profile metadata information.

In some examples, the authentication method may be at least one of authentication using subscription manager data preparation plus (SM-DP+), extensible authentication protocol for 3rd generation authentication and key agreement (EAP-AKA) authentication, authentication using an entitlement configuration server (ECS) and the SM-DP+, or OAuth/Open ID protocol-based authentication.

In another example of the disclosure, a method performed by a server in a wireless communication system may include receiving, from a terminal, a first message including information related to authentication and an identifier of the terminal through a device transfer method determined by the terminal; determining a processable authentication method based on the information related to authentication and an identifier of the terminal; and transmitting, to the terminal, a second message including the determined authentication method, wherein the device transfer method may be determined based on information related to a device transfer acquired by the terminal.

In another example of the disclosure, a terminal may include a transceiver configured to transmit and receive at least one signal; and a controller coupled to the transceiver, wherein the controller may be configured to acquire information related to a device transfer, to determine a device transfer method based on the information related to the device transfer, to transmit, to a server, a first message including information related to authentication and an identifier of the terminal through the determined device transfer method, wherein the server is identified based on the information related to the device transfer, and to receive, from the server, a second message including an authentication method determined by the server based on the information related to the authentication and the identifier of the terminal.

In another example of the disclosure, a server may include a transceiver configured to transmit and receive at least one signal; and a controller coupled to the transceiver, wherein the controller may be configured to receive, from a terminal, a first message including information related to authentication and an identifier of the terminal through a device transfer method determined by the terminal, to determine a processable authentication method based on the information related to the authentication and the identifier of the terminal, and to transmit, to the terminal, a second message including the determined authentication method, wherein the device transfer method may be determined based on information related to a device transfer acquired by the terminal.

According to an embodiment of the disclosure for solving the above problems, a method performed by a first terminal may include receiving an input for moving an installed first profile, acquiring information on whether to support a device transfer of a communication service provider and a support method; transmitting predetermined information necessary for selecting a subscriber authentication method including profile server authentication method support to an ECS; acquiring ECS generation data and a profile server address proving that it is an ECS request for subscriber authentication processing from the ECS to the profile server; and performing subscriber authentication through the profile server and replying a result thereof to the ECS.

According to an embodiment of the disclosure for solving the above problems, a method performed by a terminal may include determining a provider support method to be used in the terminal by identifying a user start terminal and a provider support method and collecting a user authentication method supportable in the terminal and transmitting the collected user authentication method to an ECS server.

According to an embodiment of the disclosure for solving the above problems, a method performed by an ECS may include selecting an authentication method with reference to possible authentication method information provided by a first terminal; generating predetermined data to be used for authentication according to the selected authentication method and transmitting the predetermined data to the terminal; verifying a user authentication result received from the terminal; and processing a series of procedures necessary for a device transfer according to the verification result and transmitting predetermined information required for profile download to the first terminal.

According to an embodiment of the disclosure for solving the above problems, a method performed by a profile server may include receiving, from a first terminal, a subscriber authentication request including data generated by an ECS; and performing subscriber authentication and replying a result thereof to the first terminal.

According to an embodiment of the disclosure for solving the above problems, a method performed by a second terminal may include acquiring, from a first terminal, predetermined information transmitted by an ECS to the first terminal; and transmitting the predetermined information to a profile server and receiving and installing a profile.

The technical problems to be achieved in the disclosure are not limited to the technical problems described above, and other technical problems not described will be clearly understood by those of ordinary skill in the art to which the disclosure belongs from the description below.

According to an embodiment of the disclosure, in a method of transferring and installing a communication service when changing a device of an eSIM terminal of a communication service provider, seamlessly UI/UX can be provided to a user in consideration of the combination of the communication service provider's device transfer support method and the user's device transfer start terminal may be provided. Further, when the user replaces an eUICC-equipped terminal, the terminal and the ECS can conveniently move a profile a device to another device using authentication information of an USIM or a profile server without inputting additional information on the user's identity authentication information. In particular, even in the case that USIM authentication is not possible, a profile can be conveniently moved a device to another device using authentication information with a profile server without requiring an ID input to the user. Further, the communication service provider can delete a profile installed in the existing terminal as needed to reuse the profile later.

BRIEF DESCRIPTION OF THE DRAWINGS

FIG. 2 is a diagram illustrating whether to support a device transfer according to a combination of a user start terminal and a communication service movement support method of a communication company for an eSIM device transfer.

FIG. 5C is a message flow diagram illustrating an embodiment of a procedure for a user interface (UI) and a user experience (UX) when a communication company provides an LPA method and a user starts a device transfer.

DETAILED DESCRIPTION

Figure 1:
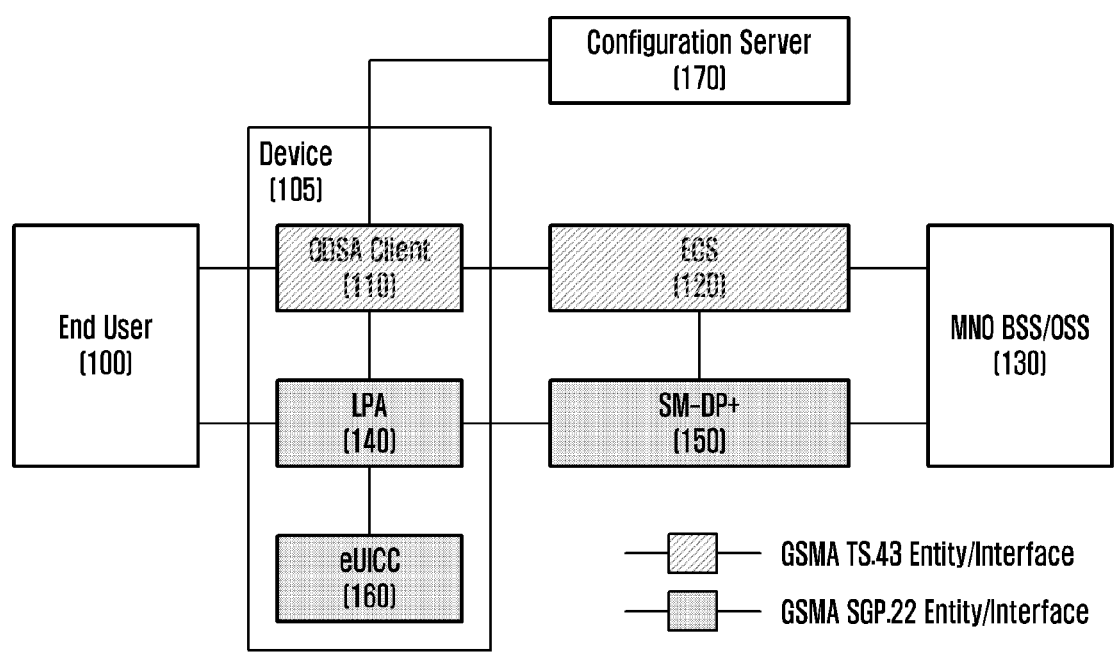
FIG. 1 is a block diagram illustrating a constitution of a communication system to which an embodiment of the disclosure is applied.

Hereinafter, an operating principle of the disclosure will be described in detail with reference to the accompanying drawings. In the following description, in describing the disclosure, in the case that it is determined that a detailed description of a related well-known function or constitution may unnecessarily obscure the gist of the disclosure, a detailed description thereof will be omitted. Terms described below are terms defined in consideration of functions in the disclosure, which may vary according to intentions or customs of users and providers. Therefore, the definition should be made based on the content throughout this specification. For the same reason, some components are exaggerated, omitted, or schematically illustrated in the accompanying drawings. Further, the size of each component does not fully reflect the actual size. In each drawing, the same reference numerals are given to the same or corresponding components. Advantages and features of the technical idea according to the disclosure, and a method of achieving them will become apparent with reference to the embodiments described below in detail in conjunction with the accompanying drawings. However, the disclosure is not limited to the embodiments disclosed below, but may be implemented in various different forms, and only embodiments of the disclosure enable the disclosure to be complete, and are provided to fully inform the scope of the disclosure to those of ordinary skill in the art to which the disclosure belongs, and the disclosure is only defined by the scope of the claims. Like reference numerals refer to like components throughout the specification. Further, in describing the disclosure, in the case that it is determined that a detailed description of a related function or configuration may unnecessarily obscure the subject matter of the technical idea according to the disclosure, a detailed description thereof will be omitted. Terms described below are terms defined in consideration of functions in the disclosure, which may vary according to intentions or customs of users and providers. Therefore, the definition should be made based on the content throughout this specification.

Hereinafter, a base station is a subject performing resource allocation of a terminal, and may be at least one of a gNode B, an eNode B, a node B, a base station (BS), a radio access unit, a base station controller, or a node on a network. The terminal may include a user equipment (UE), a mobile station (MS), a cellular phone, a smart phone, a computer, or a multimedia system capable of performing a communication function. In the disclosure, a downlink (DL) is a wireless transmission path of a signal transmitted from a base station to a terminal, and an uplink (UL) is a wireless transmission path of a signal transmitted from a terminal to a base station. Hereinafter, although LTE or LTE-A system may be described as an example, embodiments of the disclosure may be applied to other communication systems having a similar technical background or channel type. For example, 5G mobile communication technology (5G, new radio (NR)) developed after LTE-A may be included in a system to which an embodiment of the disclosure may be applied, and the following 5G may be a concept including existing LTE, LTE-A and other similar services. Further, the disclosure may be applied to other communication systems through some modifications within a range that does not significantly deviate from the scope of the disclosure by the determination of a person having skilled technical knowledge. In this case, it will be understood that each block of message flow diagrams and combinations of the message flow diagrams may be performed by computer program instructions.

Because these computer program instructions may be mounted in a processor of a general purpose computer, special purpose computer, or other programmable data processing equipment, the instructions performed by a processor of a computer or other programmable data processing equipment generate a means that performs functions described in the message flow diagram block(s). Because these computer program instructions may be stored in a computer usable or computer readable memory that may direct a computer or other programmable data processing equipment in order to implement a function in a particular manner, the instructions stored in the computer usable or computer readable memory may produce a production article containing instruction means for performing the function described in the message flow diagram block(s). Because the computer program instructions may be mounted on a computer or other programmable data processing equipment, a series of operational steps are performed on the computer or other programmable data processing equipment to generate a computer-executed process; thus, instructions for performing the computer or other programmable data processing equipment may provide steps for performing functions described in the message flow diagram block(s).

Further, each block may represent a module, a segment, or a portion of a code including one or more executable instructions for executing specified logical function(s). Further, it should be noted that in some alternative implementations, functions recited in the blocks may occur out of order. For example, two blocks illustrated one after another may in fact be performed substantially simultaneously, or the blocks may be sometimes performed in the reverse order according to the corresponding function. In this case, a term '-unit' used in this embodiment means software or hardware components such as a field programmable gate array (FPGA) or an application specific integrated circuit (ASIC), and '-unit' performs certain roles. However, '-unit' is not limited to software or hardware. '-unit' may be configured to reside in an addressable storage medium or may be configured to reproduce one or more processors. Therefore, as an example, '-unit' includes components such as software components, object-oriented software components, class components, and task components, processes, functions, properties, procedures, subroutines, segments of program code, drivers, firmware, microcode, circuit, data, databases, data structures, tables, arrays, and variables. Functions provided in the components and '-units' may be combined into a smaller number of components and '-units' or may be further separated into additional components and '-units'. Further, components and '-units' may be implemented to reproduce one or more CPUs in a device or secure multimedia card. Further, in an embodiment, '-unit' may include one or more processors.

First, terms used in this specification are defined.

In this specification, an UICC is a smart card using by inserting into a mobile communication terminal, and means a chip that enables secure mobile communication by performing subscriber authentication and traffic security key generation when accessing a mobile communication system such as GSM, WCDMA, LTE, and 5G by storing personal information such as network access authentication information, phone book, and SMS of a mobile communication subscriber. The UICC may be loaded with communication applications such as a subscriber identification module (SIM), a universal SIM (USIM), and an IP multimedia SIM (ISIM) according to a type of a mobile communication network to which the subscriber accesses and provide high-level security functions for loading various application applications such as e-wallet, ticketing, and e-passport.

In this specification, an embedded UICC (eUICC) is a security module in the form of a chip embedded in a terminal, not a removable type that may be inserted into and removed from the terminal. The eUICC may be installed by downloading a profile using over the air (OTA) technology. The eUICC may be referred to as a UICC that can download and install a profile.

In this specification, a method of downloading and installing a profile using OTA technology in the eUICC may be applied to a removable UICC that may be inserted into and removed from a terminal. That is, an embodiment of the disclosure may be applied to a UICC that may be installed by downloading a profile using OTA technology.

In this specification, the term UICC may be used interchangeably with the SIM, and the term eUICC may be used interchangeably with an eSIM.

In this specification, a profile may mean that an application, a file system, an authentication key value, and the like stored in the UICC are packaged in software form. Further, the profile may be referred to as access information.

In this specification, the USIM profile may have the same meaning as the profile or may mean that information included in the USIM application in the profile is packaged in the form of software.

In this specification, the profile server includes a function of generating a profile, encrypting the generated profile, generating a profile remote management instruction, or encrypting the generated profile remote management instruction, and may be represented as subscription manager data preparation (SM-DP), subscription manager data preparation plus (SM-DP+), or subscription manager secure routing (SM-SR).

The term 'terminal' or 'device' used in this specification may be referred to as a mobile station (MS), a user equipment (UE), a user terminal (UT), a wireless terminal, an access terminal (AT), a terminal, a subscriber unit, a subscriber station (SS), a wireless device, a wireless communication device, a wireless transmit/receive unit (WTRU), a mobile node, a mobile, or other terms. Various embodiments of the terminal may include a cellular phone, a smart phone having a wireless communication function, a personal digital assistant (PDA) having a wireless communication function, a wireless modem, a portable computer having a wireless communication function, a photographing device such as a digital camera having a wireless communication function, a gaming device having a wireless communication function, music storage and playback appliances having a wireless communication function, Internet home appliances capable of performing wireless Internet access and browsing, as well as portable units or terminals incorporating combinations of such functions. Further, the terminal may include a machine to machine (M2M) terminal and a machine type communication (MTC) terminal/device, but is not limited thereto. In this specification, the terminal may be referred to as an electronic device or simply a device.

In this specification, the terminal or the device may include software or an application installed in the terminal or the device so as to control the UICC or eUICC. The software or the application may be referred to as, for example, a local profile assistant (LPA). In this specification, the eUICC identifier (eUICC ID) may be an intrinsic identifier of the eUICC embedded in the terminal, and be referred to as an EID.

In this specification, an application protocol data unit (APDU) may be a message for a controller in a terminal or a device to interwork with the eUICC.

In this specification, a profile package may be used interchangeably with a profile or may be used as a term indicating a data object of a specific profile and be referred to as a profile TLV or a profile package TLV. The profile identifier is an intrinsic identification number of the profile and may be referred to as an integrated circuit card identifier (ICCID). In the case that the profile package is encrypted using an encryption parameter, the profile package may be referred to as a protected profile package (PPP) or a protected profile package TLV (PPP TLV). In the case that the profile package is encrypted using an encryption parameter that can be decrypted only by a specific eUICC, the profile package may be referred to as a bound profile package (BPP) or a bound profile package TLV (BPP TLV). The profile package TLV may be a data set representing information constituting a profile in a TLV (tag, length, value) format.

In this specification, an AKA is authentication and key agreement, and may indicate an authentication algorithm for accessing 3GPP and 3GPP2 networks. K is an encryption key value stored in the eUICC used for the AKA authentication algorithm, and in this specification, OPc is a parameter value that may be stored in the eUICC used for the AKA authentication algorithm.

In this specification, an NAA is an application program of a network access application, and may be an application program such as an USIM or ISIM stored in the UICC or eUICC to access a network. The NAA may be a network access module.

In this specification, an ECS may be used interchangeably with an entitlement configuration server, a subscription authentication server, a subscription server, an entitlement authentication server, and an entitlement server (ES), and an ODSA client may be used interchangeably with an ODSA and ODA.

In the disclosure, an end-user, a user, a subscriber, a service subscriber, and a user mean a person who performs a device transfer and may be used interchangeably.

In the disclosure, eSIM transfer, device transfer, subscription transfer, movement of subscription information between terminals of a communication service, and a profile movement when changing a device means a profile movement corresponding to the USIM card movement when the device is changed from a first terminal to a second terminal, which is equipped with the eUICC, and may be used interchangeably. This should be interpreted according to the context.

Further, in describing the disclosure, in the case that it is determined that a detailed description of a related function or configuration may unnecessarily obscure the subject matter of the disclosure, a detailed description thereof will be omitted.

Hereinafter, an embodiment proposed through the drawings will be described.

FIG. 1 is a block diagram illustrating a constitution of a communication system to which an embodiment of the disclosure is applied.

In FIG. 1, parts marked with a slash indicate standard entities and interfaces defined in GSMA TS.43, and shaded parts indicate standard entities and interfaces defined in GSMA.22. In the disclosure, an end user 100 is a user who performs profile movement between devices, and a device 105 means a terminal or device capable of a wireless communication service. The device 105 includes an LPA 140 and an eUICC 160, and in the case of supporting entitlement configuration exchange with an ECS, the device 105 includes an ODSA client 110. The LPA 140 and an SM-DP+ 150 are standard entities defined in GSMA SGP.22, and when downloading and installing a profile in the eUICC and when changing a device, the LPA may involve in moving the profile to another profile. The terminal 105 may receive an input for profile movement from the user 100 from the ODSA client 110 or the LPA 140 and start a device transfer procedure. In this case, in the case that there is no predetermined information on whether to support a device transfer defined in advance and a processing method, and the like, the terminal may access a configuration server 170, which is a separate server in order to acquire the information, and acquire and utilize all or part of information necessary for determining a device transfer method of the terminal. The configuration server 170 may be implemented alone or into one of a BSS/OSS 130 of the communication service provider. The mobile network operator (MNO) BSS/OSS 130 is a server system for a communication service provider to operate and process a communication service, and is also referred to as a back-end system of a communication company, and in some descriptions of the disclosure, the MNO BSS/OSS 130 and the communication service provider may be used interchangeably. The MNO BSS/OSS may perform subscription and cancellation of a communication service in eUICC device and processing of a device transfer through information exchange with SM-DP+ 150 server, which is a profile server, or an ECS 120, which is a server that processes service subscription management. The ECS 120 and the SM-DP+ 150 server may be interworked with the back-end system of the communication service provider and be implemented independently of the back-end system of the communication service or as a part of the back-end system. The ODSA client 110 and the LPA 140 may be integrated into one application or may be implemented separately. FIG. 1 illustrates that the configuration server 170 is connected to the ODSA client 110, but the disclosure is not limited thereto, and other applications of the terminal or the LPA may directly access the configuration server 170 to acquire information for device transfer processing and process subsequent procedures.

FIG. 2 is a diagram illustrating whether to support a device transfer according to a combination of a user start terminal and a communication service movement support method of a communication company for an eSIM device transfer.

As described above, when changing a device of an eUICC terminal, two methods are expected to coexist in the method of transferring and installing a communication service, and it is expected that the provider will select and support one of these methods. An As-Is table 200 represents a method that may be provided in consideration of the combination of the user start terminal and the provider support method at a time point of disclosing the disclosure. The provider support method is the ODSA method, and the provider does not provide for the user to start a device transfer in a first terminal 300, and the processing procedure is not defined in TS. 43 standard. In case that the provider support method is the LPA method and that the user starts to change a device in the second terminal 350, there is no method in which the second terminal 350 processes this. Because the LPA method uses ICCID information of the profile to move already installed in the terminal, the method is a method in which the second terminal 350 cannot currently support, but in the case that the user 100 may use the first terminal, the method may be usable by allowing it to be processed through the corresponding terminal. However, at the time point of disclosing the disclosure, the terminal does not provide a corresponding processing method. Therefore, the method of a device transfer to be provided when the disclosure is introduced is illustrated in a to-be table 210. In the as-is table 200, all parts marked as unsupported, that is, FAIL, may be supported through the disclosure, and for this purpose, a user interface (UI), user experience (UX), and call flow of the case of supporting this are illustrated with reference to FIGS. 5D and 6C.

Figure 3:
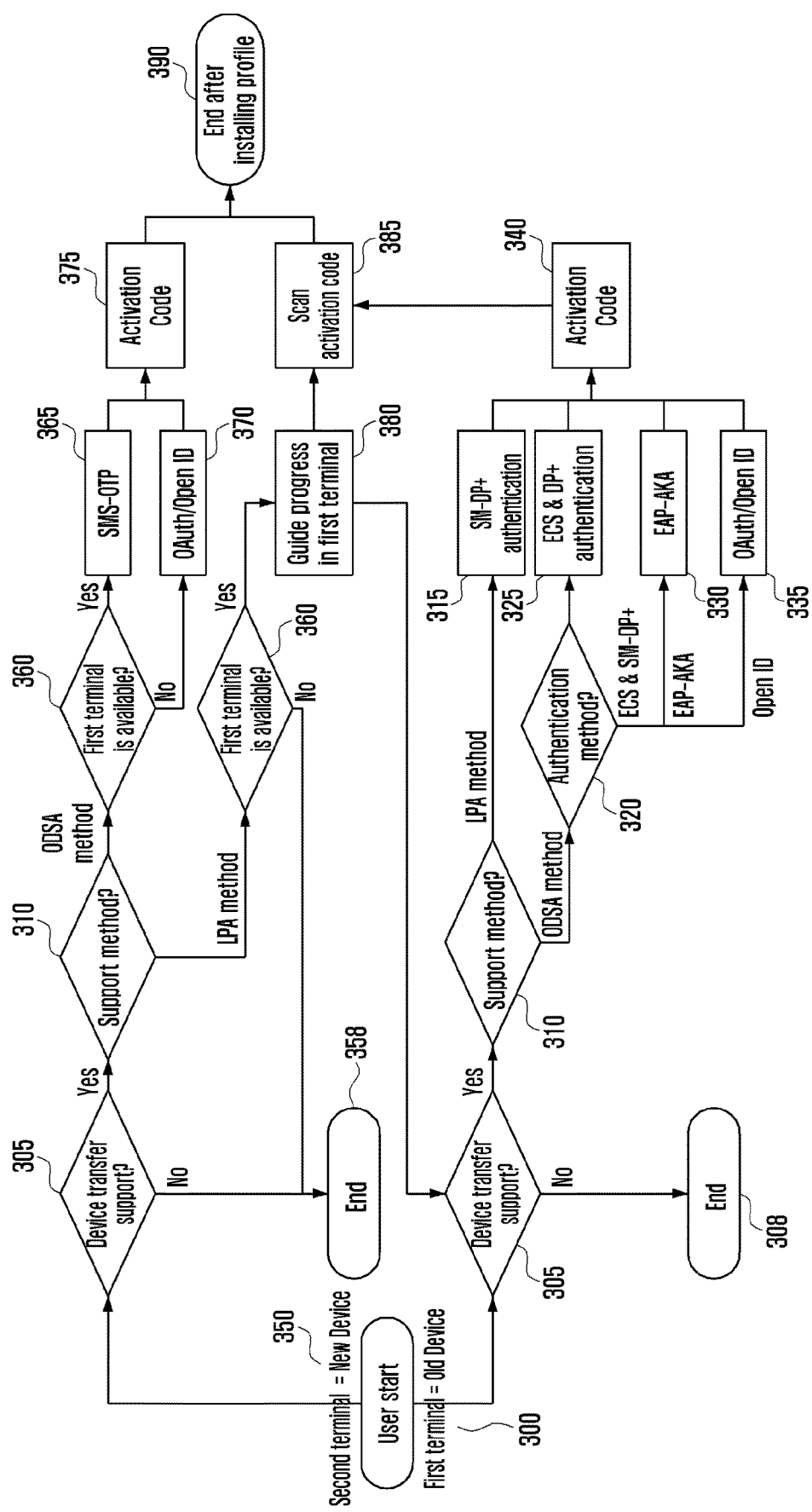
FIG. 3 is a flowchart illustrating an eSIM device transfer processing procedure and a determination criterion of a terminal.

FIG. 3 is a flowchart illustrating an eSIM device transfer processing procedure and a determination criterion of a terminal.

First, in moving a profile when the device is changed, a terminal 105 may determine whether the terminal generating an event for a device transfer by the user is an existing terminal that intends to move an existing profile or a new terminal in which the profile is to be reinstalled. Hereinafter, for convenience of description, a terminal that intends to move the existing profile will be referred to as a first terminal 300, and a terminal in which the profile is to be reinstalled will be referred to as a second terminal 350. In the case that it is not necessary to distinguish between the first terminal and the second terminal, a device 105 may be used. The device 105 may identify whether the user enters from the first terminal or the second terminal by separating the user 100 entry menu. When the user selects a device transfer menu in the device 105 and the request for a device transfer is input (300), the device 105 may identify information collected through information stored in advance in the terminal and the configuration server 170 or metadata of a profile, as described later with reference to FIG. 4 to identify whether a communication service provider supports a device transfer (305) and a support method (310) for the profile, and in performing the device transfer, the device 105 may identify a status of the terminal, including information on whether the device transfer request terminal 105 is the first terminal 300 or the second terminal 350, and finally determine (310) a device transfer method of the communication service to be used by the terminal 105. Whether to support a device transfer (305) refers to determining whether a profile previously installed in an eUICC of the first terminal 300 may be downloaded as a profile having the same communication service subscription configuration in the second terminal 350.

After identifying whether the communication service provider supports a device transfer (305) and a support method 310 for the profile, the terminal 105 may acquire information on whether it supports a device transfer method using the ODSA client and the ECS as a device transfer support method of the communication service provider for the profile or information on whether it supports a device transfer method using the LPA and SM-DP+ server. The communication service provider may support one or more device transfer methods among the above-described two device transfer methods. In the case that there is one or more device transfer support method for a profile to move by the communication service provider collected from the terminal, the communication service provider may additionally store information on a priority for applying the device transfer method to the profile metadata or the configuration server 170 and provide the information to the terminal. Further, the terminal 105 may display a screen requesting selection to the user 100 so that the user may select it or may select and use one of two methods according to a terminal basic configuration. The device transfer method using the ODSA client and the ECS will be described in the ODSA method for convenience of description later, and the device transfer method using the LPA and SM-DP+ server will be described in the LPA method, and detailed procedures including each device transfer method will be described in detail with reference to FIGS. 5A to 5D and FIGS. 6A to 6C. In the case that the terminal 105 should process in the LPA method according to the information acquired in the above method, subsequent procedures should be performed differently according to whether the terminal 105 initiating a device transfer is the first terminal 300 or the second terminal 350. In the case that the provider's device transfer method acquired by the terminal 105 is the LPA method and that the terminal 105 initiating a device transfer is the first terminal 300, the LPA 140 of the terminal may request a command requesting profile movement including predetermined information on the profile to change the device to the SM-DP+ 150. The SM-DP+ 150 may notify the communication service provider 130 of the device transfer request, and create a profile that will be downloaded for a device transfer in the second terminal 350 through an ES2+ interface defined in GSMA SGP.22 and the communication service provider 130. The SM-DP+ 150 may exchange (common mutual authentication) a signature value of the eUICC certificate and the SM-DP+ between the SM-DP+ 150 and the eUICC 160 of the first terminal 300 in which the profile to move is installed, and authenticate a subscriber by authenticating the eUICC 160 and the terminal in which the profile is installed. Hereinafter, for convenience of description, in the disclosure, the above method will be referred to as an SM-DP+ authentication method 315. When a subscriber is authenticated through SM-DP+ authentication, the SM-DP+ 150 may send data necessary for downloading a profile to be generated in the second terminal 350 to the first terminal 300. When the first terminal 300 acquires the corresponding data and displays the data in the first terminal 300 in the form of a quick response (QR) code, the second terminal 350 may scan (340) a QR code displayed on a screen of the first terminal and receive and install the profile from the profile server 150 included in the QR code, thereby completing (390) profile transfer installation according to the device transfer. Instead of displaying information with a QR code, the first terminal 300 may transmit information to the second terminal 350 via short-distance communication such as NFC, Bluetooth, UWB, or WiFi communication, or a server. However, in the case that the first terminal 300 displays information in the QR code, the second terminal 350 may install the profile through a normal eSIM profile download process of scanning the QR code; thus, there is an advantage in performing a device transfer operation without modification of the existing profile download procedure. Hereinafter, an example using a QR code is exemplified, but the embodiment of the disclosure is not limited thereto. The following illustrates a constitution example of data required to download a profile to be displayed in a QR code.

LPA:x SMDP.TEST.COM$XXXXX

In the above example, SMDP.TEST.COM means a profile server address as an example, $ is a delimiter that distinguishes each information, LPA: means that the data is an activation code format used for downloading a profile, x means the type of activation code, and for example, the value may be a number such as 1, or 2, or 3, or 4, and XXXXX is data of an activation code token (ACToken)

area, may be information that encodes information including part or all of ASN.1 Data below, and is marked with XXXXX for convenience.
ASN.1 Data

```
OtherSignedNotification ::= SEQUENCE {
tbsOtherNotification NotificationMetadata,
euiccNotificationSignature [APPLICATION 55] OCTET STRING, -- eUICC signature of
tbsOtherNotification, Tag '5F37'
euiccCertificate Certificate, -- eUICC Certificate (CERT.EUICC.ECDSA) signed by the EUM
eumCertificate Certificate -- EUM Certificate (CERT.EUM.ECDSA) signed by the requested CI
}
NotificationMetadata ::= [47] SEQUENCE { -- Tag 'BF2F'
seqNumber [0] INTEGER,
profileManagementOperation [1] NotificationEvent, /*Only one bit SHALL be set to 1*/
notificationAddress UTF8String, -- FQDN to forward the notification
iccid Iccid OPTIONAL
}
```

In this case, the encoding may be a method of 1) encoding data of the following ASN.1 format in a DER method and then hexadecimal-encoding again the data to enable to express the data in characters and 2) encoding data of the following ASN.1 format in a DER method and then BASE64-encoding the data to enable to express the data in characters. Hereinafter, for convenience of description, the corresponding data required to download a profile may be collectively referred to as an activation code. Although not described in the drawing, before deleting a profile in order to move a profile from the first terminal 300, the first terminal 300 may acquire device information (e.g., eUICCInfo, DeviceInfo) of the second terminal 350, then transmit the device information to the profile server to check whether profile reinstallation is possible in the second terminal 350, and then perform the subsequent process. Further, although not described in the drawing, the first terminal 300 may acquire an international mobile equipment identity (IMEI) of the second terminal 350 and request (e.g., identify with *#06 # on the terminal keypad) an input through a user screen to add and transmit the IMEI when requesting a device transfer to the ECS or the LPA. In the case that the provider's device transfer method acquired by the terminal 105 is the LPA method and that the terminal 105 initiating the device transfer is the second terminal 350, the second terminal 350 may create a menu that can guide different procedures to the user according to whether the first terminal 300 is available and display the menu on the screen. In the case that the first terminal 300 is available, the second terminal 350 may display a guide message on the progress in the first terminal 300 and move to a menu that may scan a QR code displayed from the first terminal 300 and stand by. After the user performs the above-described LPA method in the first terminal 300, when the first terminal 300 acquires data required for downloading a profile from the profile server, and displays the data in the form of a QR code, the second terminal 350 may scan (385) the QR code to process the subsequent procedure in the same way. In the case that the user 100 inputs that the first terminal 300 does not exist, the second terminal 350 may display a guide message indicating that the communication service provider cannot support a device transfer service of the profile without the existing first terminal 300 and end (308) the procedure. In the case that the provider's device transfer method acquired by the terminal 105 is the ODSA method and that the terminal 105 initiating the device transfer is the first terminal 300, the terminal may collect status information of a profile to move installed in the terminal and information on the authentication method implemented in the terminal to transmit the information from the ODSA client 110 to the ECS 120, and the terminal or the server may determine an authentication method for the corresponding profile. The profile status information is information on whether the profile is enabled or disabled and enabled means a state that the network is activated to a state in which the terminal 105 can access file data of the corresponding profile. Disabled means a state that the network is not activated to a state in which the terminal 105 cannot access file data of the corresponding profile. The terminal may determine an authentication method according to the priority of the authentication method configured therein and transmit the authentication method to the ECS 120, and the authentication method may be determined in a manner in which the ECS 120 finally identifies, determines and replies. Alternatively, the terminal may transmit status information of a profile to move from the terminal 120 and information on all authentication methods capable of being supported by the terminal to the ECS 120, and the ECS 120 may select one authentication method and reply the method in a method to use in consideration of the authentication method and the priority of authentication method application of the service provider for the profile. In the disclosure, the first terminal 300 may select one of an ECS & DP+ method 325, which is an ECS 120 and SM-DP+ 150 cooperative authentication method 315 as an authentication method that may be supported by the terminal for proofing ODSA service access qualification, an EAP-AKA method 330 using a k value and an internal mobile subscriber identifier (IMSI), which is subscriber identifier information stored in the SIM module, and an OAuth/Open ID method 335, which is a web service login-based authentication method and then identify whether the corresponding access terminal and the subscriber have ODSA service qualification authentication through data exchange with the ECS 120. A procedure including each authentication method will be described later in detail with reference to FIGS. 5A to 5D. When a qualification of the terminal and subscription for ODSA service access is authenticated in the ECS 120, the ECS 120 may acquire data necessary for the second terminal 350 to download a profile from the SM-DP+ 150 through a communication company back-end system 130 and reply the data to the ODSA client of the first terminal 300. Alternatively, the communication company back-end system 130 may reply including a method of acquiring data by data self-generation of the first terminal 300 instead of transmitting data necessary for downloading the profile from the corresponding SM-DP+ 150. A detailed method in which the first terminal 300 acquires the corresponding data will be described later with reference to FIG. 5C. When the data acquired by the first terminal 300 is displayed on the first terminal 300 in the form of a QR code, the second terminal 350 may scan the QR code displayed on the screen of the first terminal 300 and receive and install the profile from the profile server 150 included in the QR code to complete (390) profile movement and installation according to the device transfer. In the case that the provider's device transfer method acquired by the terminal 105 is the ODSA method and that the terminal 105 initiating a device transfer is the second terminal 350, the terminal may acquire corresponding information from the user 100 through a user input on whether the first terminal 300 exists. In the case that information that the user 100 may use the first terminal 300 is input to the second terminal 350, the second terminal 350 may receive an input of a phone number (MSISDN) of the first terminal 300 to receive an authentication code from the user and transmit the phone number (MSISDN) to the ECS 120. The ECS 120 may exchange a message with a separate authentication server of the communication company, and the separate authentication server of the communication company may transmit an authentication code with a text message to a corresponding phone number (MSISDN). When the authentication code is received with a text message in the first terminal 300, the user may input the authentication code to the second terminal 350 to authenticate that there is the right to access to the ODSA service. In the case that the provider's device transfer method acquired by the terminal is the ODSA method and that information that the user 100 cannot use the first terminal 300 is input to the second terminal 350, the second terminal 350 may connect to a web portal or web application to select and authenticate the OAuth/Open ID method 370, which is a subscriber authentication method through a login method. When it is authenticated that the access terminal and the corresponding subscriber are qualified to access the ODSA service through such a one time password or password (SMS-OTP) method 365 or OAuth/Open ID method 370, the ECS 120 may transmit data required for the second terminal 350 to download a profile from the profile server 170 to the ODSA client 110 of the second terminal 350 in an activation code format. The data is transmitted from the ODSA client 110 of the terminal to the LPA 140, and the LPA 140 may download a profile to be transfer-installed from the SM-DP+ server 150 and install the profile in the eUICC 160 to process profile movement according to the device transfer. In FIG. 3 and subsequent drawings, because the point may be harmed, a procedure for combining and using a plurality of authentication methods has not been described in detail, but by processing authentication with one or more authentication methods according to information acquired in FIG. 4 (e.g., provider support authentication methods) and a user input (e.g., whether the first terminal is available), profile status information (e.g., profile activation status), and the like, the terminal may enhance authentication for processing a device transfer. For example, in the case that the second terminal 350 uses the ODSA method and that the first terminal 300 is available (360), and in the case that the provider supports both the OAuth/OpenID and the SMS-OTP method, the second terminal 350 may log in to a web portal of the provider in the OAuth/Open ID method 370 to authenticate a subscriber, and the first terminal 300 is available; thus, the second terminal 350 may additionally provide authentication (355) through the SMS-OTP.

Figure 4:
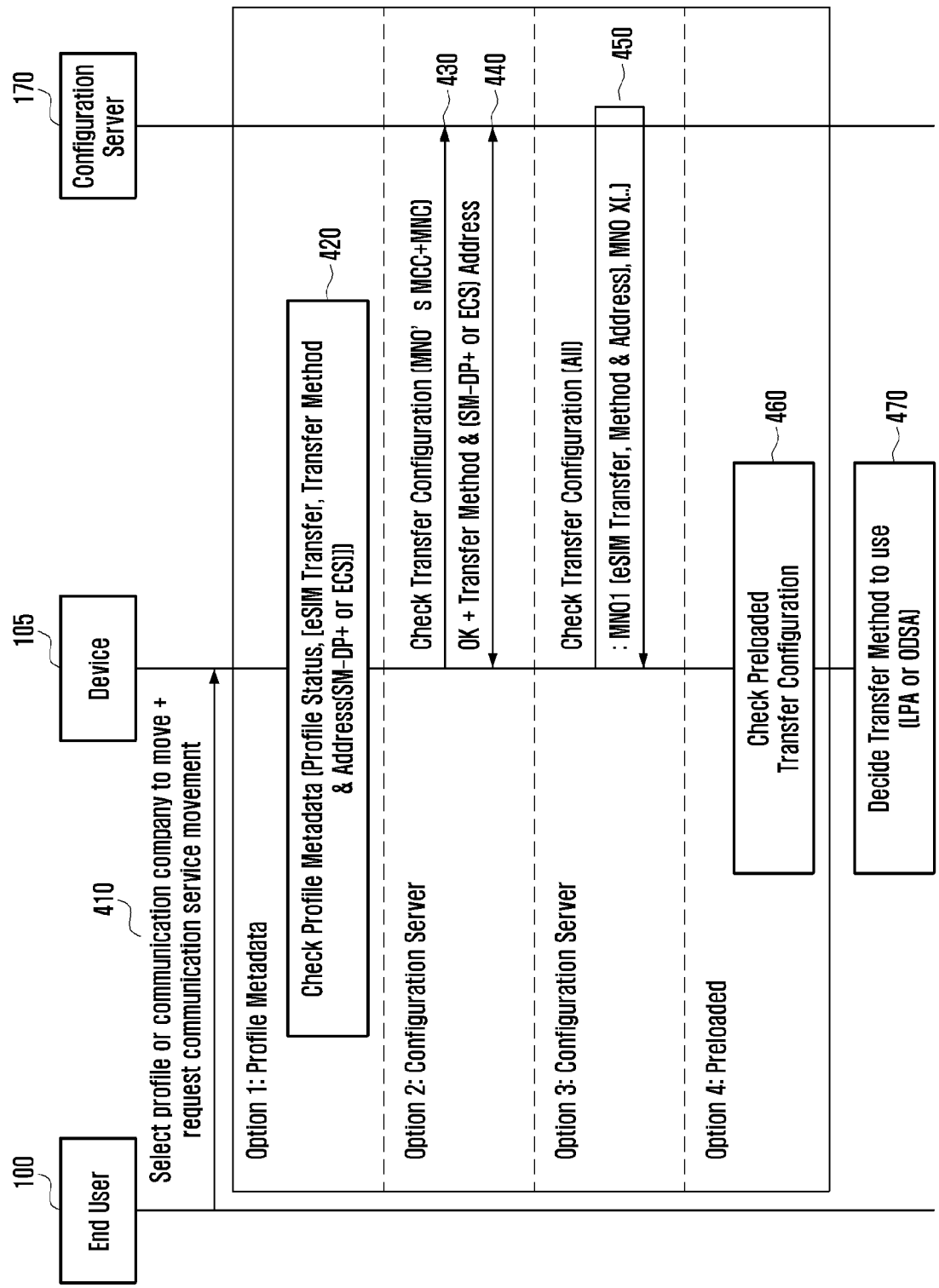
FIG. 4 is a message flow diagram illustrating a method of acquiring eSIM device transfer configuration information of a provider in a terminal.

FIG. 4 is a message flow diagram illustrating a method of acquiring configuration information for profile movement processing when a device is changed in a terminal 105 equipped with an eUICC.

In the device 105, in the case that the end user 100 selects a profile to move to a new terminal when changing a device in the terminal, the terminal may acquire an MCC+MNC (meaning mobile country codes (MCC) and mobile network codes (MNC) defined in the ITU-T recommendation E.212) value with mobile communication company identification information from metadata information of the profile. Alternatively, in the case that the terminal does not have a profile to move, that is, in the case that a new terminal attempts to change a device, the terminal 105 may provide a menu for selecting a communication service provider to the user 100, thereby acquiring MCC+MNC information of the communication service provider. Through the MCC+MNC information, the terminal may determine which provider's profile to identify a movement configuration. Further, the terminal 105 may provide a menu for moving the profile for the end user 100 to select to acquire information on the start of a procedure for changing the device of the profile and whether to access through which terminal of the first terminal 300 or the second terminal 350. The terminal 105 may identify device transfer configuration information of the provider for profile movement to select (470) one of an LPA method or an ECS method as a method to be used for profile movement. Device transfer configuration information required by the terminal may include information on whether the communication service provider for the profile supports a device transfer and include authentication method identification information and information on a preference priority such as a device transfer support method (LPA method or ODSA method), SM-DP+ server address or ECS address according to the support method, and a support user authentication method, for example, EAP-AKA, ECS&DP+ and OAuth/Open ID. As a method of identifying the device transfer configuration information, the terminal 105 may perform the following.

Option 1: In the case that the user 100 selects a profile to move through an UI of the terminal, the LPA 140 may perform an ES10c.GetProfilesInfo( ) function call defined in GSMA SGP.22 to the eUICC 160 to acquire status information and metadata information of the profile.

Option 2: In order to save the memory and battery, the terminal 105 does not receive all of device transfer configuration information of communication service providers stored in the configuration server 170 at a specific period or when the terminal is initially booted, but when the user 100 selects a communication company in the UI of the terminal 105, the terminal 105 may request device transfer configuration information on the MCC+MNC of the communication company to the configuration server 170, and acquire device transfer configuration information of a specific provider in response to the request.

Option 3: In the case that the configuration server 170 exists to process the device transfer and the server address is configured in the terminal 105, the terminal may bring, store, and use some or all of device transfer configuration information from the server at the time of initial booting or at a specific period according to the terminal configuration. In the case that the user selects a specific communication service provider or selects a profile to move, the terminal 105 may identify the corresponding information stored in the memory of the terminal to acquire and utilize a matching value.

Option 4: In the case that a device transfer method for each communication service provider or a terminal for a communication service provider is released, the terminal 105 preloads the device transfer method of the communication company, and as described above, when the user 100 selects a profile or a communication service provider of a profile to move from the menu, the terminal 105 may match it to information stored in the memory to identify device transfer configuration information.

The terminal 105 may use one or more of the above-described four methods in combination, and in the case that device transfer configuration information acquired through the corresponding option is different, the terminal 105 may determine and configure a method according to the terminal configuration. As an example, the terminal may determine the most recent configuration information or the priority in selecting metadata of a profile as another example. Hereinafter, a procedure for receiving and using the corresponding configuration information will be described in detail for each situation through the embodiments to be described with reference to FIGS. 5A to 5D and FIGS. 6A to 6C.

FIGS. 5A to 5D illustrate embodiments of a device transfer method in the case of starting in the first terminal 300. The entire procedure for device transfer processing may be roughly divided into the following procedures: step in which the first terminal 300 determines eSIM configuration information, step of performing terminal and user authentication for identifying an ODSA service qualification, step of issuing an activation code when the authentication is completed, and step that the second terminal 350 acquires the corresponding information to download a profile, and completes movement installation.

Figure 5A:
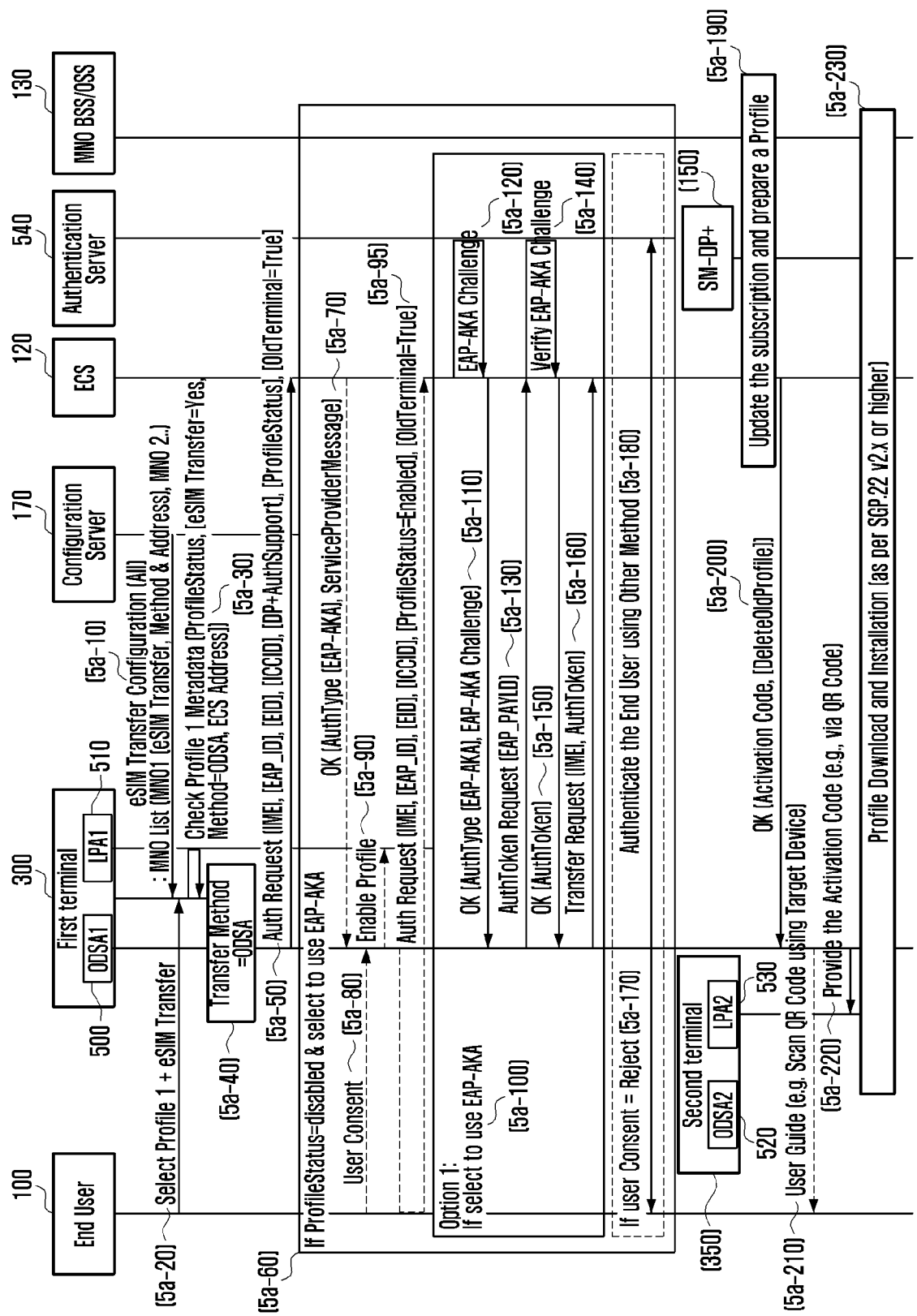
FIG. 5A is a message flow diagram illustrating an embodiment in which a communication company provides an ODSA method and uses EAP-AKA authentication.

FIG. 5A is a message flow diagram illustrating an embodiment in which a communication company provides an ODSA method and uses EAP-AKA authentication.

The end user 100 may select a profile to move for a device transfer in the LPA of the first terminal 300 or a screen of an application in which the LPA is implemented, and select a menu to move the corresponding profile (step 5a-10). When the corresponding menu is selected, the terminal 300 may have communication service provider identification ID information (MCC+MNC) of the corresponding profile, identify whether configuration information for changing an eSIM device of the corresponding communication company is stored in the terminal, and the LPA1 140 of the terminal may perform an ES10c.GetProfilesInfo( ) function call defined in GSMA SGP.22 to the eUICC 160 of the terminal to acquire status information of the corresponding profile. The LPA1 410 may additionally identify information on whether to support a device transfer in metadata of the corresponding profile from the eUICC 160 of the terminal and whether there is identification information on a support method or a server address for subsequent processing together with the status information. In steps 5a-10 to 5a-30, a method of identifying through option 1 and option 3 is exemplified, but the method of acquiring status information is not limited thereto, and as described above with reference to FIG. 4, status information may be acquired by using and combining one or more of options 1 to 4. Through the collected information, the first terminal 300 may support the ODSA method in which the communication company uses the ODSA client 110 and the ECS 120, and acquire an ECS address for processing the corresponding method and determine a device transfer method to be processed thereafter in the terminal (step 5a-40). The ODSA client of the first terminal 300 or the ODSA1 500, which is an app in which the ODSA client is implemented, may acquire status information of the profile acquired through profile metadata identification (step 5a-30) from the LPA1 510, and identify a capability of the terminal to collect possible authentication methods of the terminal and transmit an authentication request to the ECS 120. As an example, the authentication request may be represented as step 5a-50. The corresponding authentication request message may include an IMEI as a terminal identifier, identification information on authentication methods implemented in the terminal, and define and include an ICCID, IMEI, or extensible authentication protocol (EAP) ID, or a new identifier as identification information that may infer that the requesting terminal is the first terminal 300 and include an ICCID as a target profile ID to move and status information of the corresponding profile. In the information included in the authentication request message, Information required for device transfer processing such as identification information indicating that the requesting terminal is the first terminal 300, an ICCID as the target profile ID to move, and status information of the corresponding profile may not be added to the authentication request message but be included at the device transfer request time point (step 5a-160) after authentication is completed and be transmitted from the terminal. Identification information on the authentication method implemented in the terminal may be used as an identifier indicating whether the corresponding authentication method has been implemented in the terminal or has been implemented in the terminal and is available at the corresponding transmission time point. In the case that the ECS 120 may determine profile status information through identification information on the corresponding authentication method, the terminal may transmit the message without including profile status information. As identification information on the authentication method implemented in the terminal, in the case that extensible authentication protocol for 3rd generation authentication and key agreement (EAP-AKA) is implemented in the terminal, the terminal may include an EAP ID in the authentication request and transmit the authentication request (step 5a-50). In the case that the ECS&DP+ method is used as an authentication method usable in the terminal, a new identifier to distinguish the ECS&DP+ method may be defined or an existing identifier (e.g., SM-DP+Address) may be used as the corresponding identification information. The corresponding identifier will be referred to as DP+AuthSupport for convenience in the disclosure. In the case that the terminal does not have identification information on an authentication method or an authentication token, the ECS may determine that the terminal may provide only OAuth/Open ID. When the ECS 120 receives authentication identification information on one or more authentication methods supported by the terminal from the terminal (step 5a-60), for example, when the ECS 120 includes and receives an EAP ID as an EAP-AKA identifier and DP+AuthSupport as an identifier for ECS&DP+ authentication, the ECS 120 may select one possible method according to the provider's preference and whether the provider supports an authentication server, and reply the selected method to the terminal. An example of identification information or new identifier indicating that the requesting terminal is the first terminal 300 may be a new value such as OldTerminal=True, old terminal ID=Old terminal IMEI in step 5a-50, or in the case that an intrinsic identification number ICCID of a profile to move is included, the ECS 120 may determine the first terminal 300 with old_termnal_iccid=ICCID as an example. Further, the ECS 120 may combine the corresponding ICCID information and OldTerminal=True or old terminal ID=Old terminal IMEI to determine the first terminal 300. The ECS 120 may determine whether relay with the AAA (authentication, authorization, and accounting) authentication server of the provider may be supported in order to perform EAP-AKA authentication and identify a priority of the authentication method that the provider wants to provide in the case that multiple authentication methods are available. Steps 5a-60 to 5a-170 illustrate a method when the ECS 120 performs authentication with EAP-AKA through the corresponding identification. As identification information on the authentication method implemented in the terminal, in the case that extensible authentication protocol for 3rd generation authentication and key agreement (EAP-AKA) is implemented in the terminal, the terminal may transmit the authentication request including EAP_ID, as described above (step 5a-50). The first terminal 300 may include an international subscriber identity module (IMSI) value of the profile selected by the user for moving in the EAP ID to transmit the EAP ID to the ECS 120, and cannot acquire the corresponding value, but in the case that EAP-AKA is implemented in the terminal, the first terminal 300 may configure and transmit the EAP ID value to NULL or empty value or may define and provide a separate identifier or value for indicating the EAP ID value. The IMSI value is information that may acquire from internal data of the profile or metadata of the profile when status information of the profile is enabled and it may indicate that EAP-AKA is implemented so that it may be provided and that the corresponding authentication may be used at the current request time point that performs a device transfer. The failure to acquire the corresponding information means that EAP-AKA has been implemented in the terminal at the corresponding time point, but that the profile status information is disabled and the ECS 120 may determine status information. The first terminal 300 may include and transmit together status information of the profile acquired in step 5a-30 to the ECS 120 to clearly notify the ECS 120 that EAP-AKA authentication is available in the corresponding terminal (step 5a-50). In the case that EAP-AKA has been implemented in the terminal through the authentication request message received by the ECS 120, but that the profile state is disabled, the ECS 120 may reply, to the terminal, the provider message including information on whether to perform user authentication with EAP-AKA and a processing guide (step 5a-70). In this case, the terminal may display the provider message to acquire the user's consent, and the user 100 may approve or reject an authentication process with EAP-AKA (step 5a-80). In case of approval, by temporarily changing the profile state from a disabled state to an enabled state (step 5a-90) with the eUICC, the LPA1 510 may acquire user consent to enable EAP-AKA authentication and then in the case that the user permits, the LPA1 510 may process 10c.EnabldProfile( ) with the eUICC. When the profile state is changed to the enabled state, the LPA1 510 may acquire the profile status information and IMSI value from the eUICC and transmit them to the ODSA1 500. The ODSA1 500 of the first terminal that has received them may transmit an authentication request message to the ECS 120 using the EAP_ID as an IMSI value, as in step 5a-95. Alternatively, the ODSA1 500 may additionally include and transmit the profile status information to notify the ECS 120 that the profile state has been changed and that EAP-AKA authentication is available. In the case that the user rejects (step 5a-170), the first terminal 300 transmits a rejection message to the ECS 120, and when the ECS 120 receives the rejection message, the ECS 120 may select an authentication method to be used with reference to another authentication method of the terminal received through the existing received (step 5a-50) to process the authentication procedure (step 5a-180). The EAP-AKA method may use a problem-response mechanism and generate an encrypted session through symmetric key-based authentication. When the ECS 120 determines that the EAP-AKA method is available with authentication identification information of the terminal or the combination of the terminal identification information and the profile status information, and selects the EAP-AKA method, the ECS 120 may request the EAP-AKA challenge to a provider authentication server 540 (step 5a-120). The provider authentication server 540 performs the AKA algorithm to generate an EAP-AKA Challenge value as defined in "RFC4187 Extensible Authentication Protocol Method for 3rd Generation Authentication and Key Agreement (EAP-AKA)" and replies the value to the ECS 120, and the ECS 120 may reply, to the terminal, together the EAP-AKA challenge with the selected authentication method (here, the EAP-AKA method) and a value required for verification (steps 5a-110). The authentication method selected by the ECS 120 may be notified by a separate delimiter (e.g., AuthType (EAP-AKA) in step 5a-110), or it may be determined that the ECS 120 has determined the corresponding authentication method by receiving (e.g., receiving only the EAP-AKA challenge value of step 5a-110) predetermined information that may determine the corresponding authentication method. When the corresponding EAP-AKA challenge is received, the eUICC of the first terminal 300 may perform the EAP-AKA algorithm using the corresponding challenge value and a security key value of the SIM module, and reply information including the result value to the ECS 120 (step 5a-130). The ECS 120 may relay the received information to the provider authentication server 540, and the provider authentication server 540 may verify the EAP-AKA challenge value from the value received from the first terminal 300 (step 5a-130) and reply (step 5a-140) to the ECS 120 whether to authenticate. In the case that the corresponding authentication result (steps 5a-140) is successful, the ECS 120 may generate an authentication token (AuthToken) that may be used thereafter for a session connection with the ECS 120 and transmit the authentication token (AuthToken) to the first terminal 300 (steps 5a-150). The first terminal 300 may request the movement of the device subscribed to the communication service (steps 5a-160) using the IMEI and the received authentication token as parameters with intrinsic identification information of the terminal (steps 5a-160). As described above, information required for device transfer processing such as identification information indicating that the requesting terminal is the first terminal 300, an ICCID as the target profile ID to move, and status information of the corresponding profile may be not added to the authentication request message, and after authentication is completed, a method of transmitting information including the information from the terminal at the device transfer request time point (steps 5a-160) is possible. This may be equally applied to another embodiment in which the first terminal 300 requests a device transfer. Specific authentication procedures and parameters between the authentication server and the terminal using EAP-AKA refer to the "RFC4187 Extensible Authentication Protocol Method for 3rd Generation Authentication and Key Agreement (EAP-AKA)" specification.

When the corresponding authentication is completed, the ECS 120, the SM-DP+ server 150, and the MNO BSS/OSS 130 may acquire information necessary to change service subscription information, and the SM-DP+ server 150 and the MNO BSS/OSS 130 may prepare to generate a profile (step 5a-190). In the step 5a-190, the ECS 120 may request new subscription information including a subscription ID mapped to the current ICCID of the corresponding profile or an IMEI of a new terminal to the communication service provider's back-end system. The MNO BSS/OSS 130 that has received the information, the MNO BSS/OSS 130 may perform a series of processes for profile generation through the SM-DP+ server 150 and the ES2+Interface defined in SGP.22 to acquire information including an ICCID and activation code of a profile to be installed in the second terminal 350 and reply the information to the ECS 120. The ICCID and the activation code may be acquired and replied to the ECS 120. Information required for changing the ECS service subscription information may be updated at the corresponding time point or at a specific time point later to change subscription information stored in the ECS 120. The ECS 120 may transmit the received activation code to the ODSA1 500 of the first terminal (step 5a-200). According to the provider's policy, the ECS 120 may transmit (step 5a-200) information including a value on whether to delete the corresponding profile from the first terminal 300. When the corresponding information is received, the first terminal 300 displays a method of acquiring the activation code transmitted from the second terminal 350 to the first terminal 300 with a user guide message of the corresponding terminal (step 5a-210). In the case that the first terminal 300 receives together a value on whether to delete from the first terminal 300 (step 5a-200), the first terminal 300 may guide the user of deletion of the existing profile and notify that the device transfer may be processed only when the existing profile is deleted, thereby acquiring the user's consent. In the case that the user agrees to delete, when the ODSA client or ODSA1 500, which is an app in which the ODSA client is implemented in the first terminal requests an LPA1 510 to delete the profile, the LPA1 510 may perform an "ES10c.DeleteProfile" function call for the profile to move to delete the profile from the eUICC, and reply a notification on deletion of the profile to the LPA1 510 or ODSA1 500. When the ODSA1 500 receives a notification for deleting the profile through the LPA1 510 or LPA1, the UE may process to activate and provide the activation code. The end user 100 may acquire an activation code from the second terminal 350 (step 5a-220) according to the guidance in step 5a-210. For example, the activation code may be displayed in the form of a QR code with the user's UI of the second terminal 350, and the QR code may be scanned using a camera of the first terminal 300. When the activation code is input to the second terminal 350, the LPA2 530 may acquire an activation code, and access an SM-DP+ server address configured in the activation code to download the profile to the second terminal according to a remote SIM provisioning procedure defined in GSMA SGP. 22, thereby completing installation (step 5a-230). When the download installation process is completed, the back-end system 130 of the MNO transmits an ICCID of the new profile installed in the second terminal 350 or an ICCID together with the IMEI of the second terminal 350 to the ECS 120, and the ECS 120 matches the ICCID to the ICCID value acquired in (step 5a-120), and in the case that the ICCID and the ICCID value are the same, the ECS 120 may update the corresponding subscription information and optionally reply the update result to the provider back-end system 130.

Figure 5B:
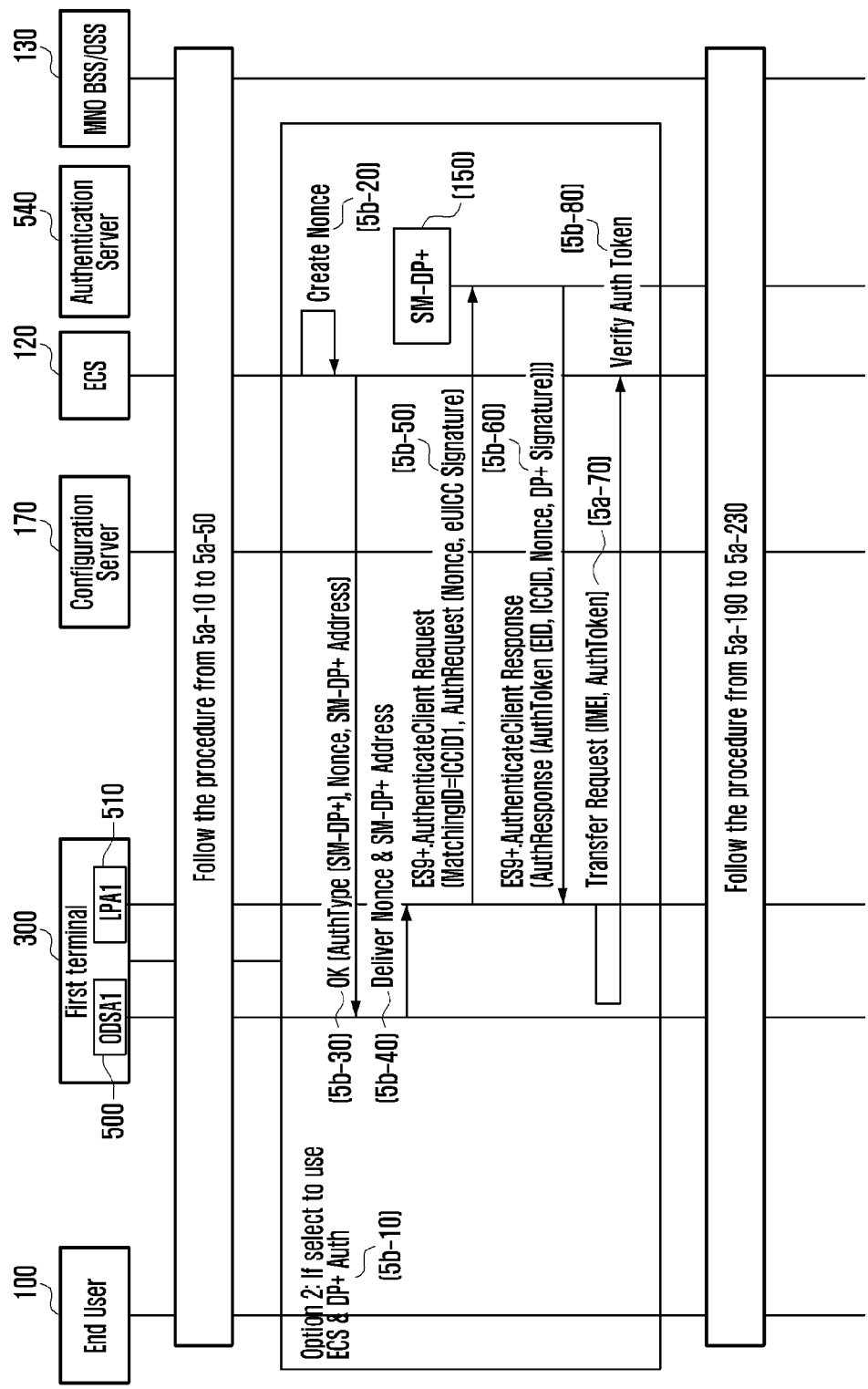
FIG. 5B is a message flow diagram illustrating an embodiment in which a communication company provides an ODSA method and uses ECS/SM-DP+ authentication.

FIG. 5B is a message flow diagram illustrating an embodiment that uses an ECS/DP+ method as an authentication method for a profile movement supporting an ODSA method starting in a first terminal.

As described above as a description on steps 5a-10 to 5a-50 of FIG. 5A, the first terminal 300 may acquire configuration information on a device transfer through a profile, a memory, and a configuration server 170. Thereafter, in performing terminal and subscriber authentication, in the case of performing an ECS&DP+ authentication method, the terminal may request authentication by including an identifier indicating that DP+AuthSupport is possible in an authentication request transmitted to the ECS 120. In the disclosure, hereinafter, for convenience of description, DP+AuthSupport of step 5a-50 is indicated as an arbitrary identifier, but the disclosure is not limited to the name, and the terminal may use an SM-DP+ address capable of performing authentication as an identifier with identifier information indicating that authentication may be performed with SM-DP+.

When the corresponding authentication method is received, the ECS 120 may identify a capability for supporting the corresponding authentication method by including information on whether a GSMA root certification issuer (CI) certificate and the SM-DP+ address to be redirected so as to perform the corresponding authentication are configured and determine processing with the corresponding authentication method. In the case where the terminal uses the SM-DP+ address capable of performing authentication as the identifier, the ECS 120 may additionally determine whether to use the received SM-DP+ address as the SM-DP+ address to be redirected.

When the corresponding authentication method is determined, the ECS 120 may generate a nonce value, which is arbitrary data (step 5b-20), and reply a message including an ECS&DP+ authentication method, an SM-DP+ server address to be authenticated, and a generated nonce value to the first terminal 300 (step 5b-30).

As described above with reference to FIG. 5A, the ECS 120 may explicitly notify the terminal of the selected authentication type, and even if the selected authentication type is not explicitly provided, the terminal may determine the authentication type through provision of predetermined information that the terminal may determine, that is, for example, a reply to the SM-DP+ server address to be authenticated. As an example, the ECS may request redirection to the SM-DP+ server address to be authenticated with the HTTP(s) "302 Found" response structure that replies when the ECS selects the OAuth/Open ID authentication method, and in this case, one of the following examples may be included.

Example 1) Http(s) Response—302 Found

Include the following in the header
Location: <SM-DP+ address to perform authentication>/authorize?
Include the following in the body
response type=code&
scope=SM-DP+Auth&
nonce=<ECS generation nonce value>&
Client LD=<ID pre-issued from SM-DP+ to be authenticated by ECS>&
redirect URL=<ECS address encrypted with AES as address to reply>

Example 2) Http(s) Response—302 Found

Include the following in the header
Location: <SM-DP+ address to perform authentication>/authorize?
Include the following in the body
response type=SM-DP+Auth&
nonce:=ECS generation nonce value& client ID=<ID pre-issued from SM-DP+ to be authenticated by ECS>&
redirect URI:=<ECS address encrypted with AES as address to reply As in Example 1) or Example 2), in the case that the scope or response type of the HTTP(s) "302 Found" response structure includes an identifier indicating DP+ authentication and is replied, the terminal may determine that the ECS requests to authenticate with ECS&DP+ instead of an OAuth/Open ID method, the ODSA1 500 may transmit received data to the LPA1 510 with an internal operation of the first terminal 300 (steps 5b-40), and then perform the DP+ authentication procedure as follows. In the case of an OAuth/Open ID authentication method, a code received as a response type requires a client id, redirection URI, and binding, and the initial Http(s) response—302 Found includes the client id and redirection URI and should be transmitted. The OAuth2.0/OIDC sever may issue a client ID for the ECS in advance through a prior contract and have information on redirection URI, and when the terminal requests authentication with a specific client ID and redirection URI, the OAuth2.0/OIDC sever may verify the information, issue a code, and reply. However, because ECS/SM-DP+ authentication may be processed without a prior contract with the SM-DP+ and the ECS, in the case that Http(s) response—302 Found includes an identifier indicating DP+ authentication, even if the Http(s) response—302 Found does not include one or all of the client ID and the redirect URI, the terminal does not process it as an error but should process it as a DP+ authentication procedure.

Although not illustrated in the drawing, a mutual authentication procedure may be first performed before performing the procedure (step 5b-50) between the eUICC and the SM-DP+. First, the LPA1 510 may request ES10b.GetEUICCChallenge to the eUICC of the first terminal 300 in which the corresponding profile is installed, receive an eUICCChallenge value with the corresponding message value, and transmit ES9+.InitiateAuthenticate request message with a message including the eUICCChallenge value to the SM-DP+ 150. The profile server may verify the corresponding value to generate a transaction ID, and generate and reply a signature of the profile server for data including the transaction ID and eUICCChallenge value. In this case, the InitiateAuthenticate reply message may include the profile signature value and Transaction ID. After receiving the InitiateAuthenticate reply message, the first terminal 300 may generate a nonce value (step 5b-40) received from the ECS 120, an ICCID of the device transfer target profile, and eUICC signature data in which the ICCID is installed and transmit data including them to the SM-DP+ server 150. An EID may be included in addition to the eUICC signature data or as information replacing the eUICC signature data, and a message including the EID may be transmitted. An example of the transmitted message may be a message such as ES9+.AuthenticateClient Request (MatchingID=ICCID1, AuthRequest (Nonce, eUICC Signature) (step 5b-50). When the SM-DP+ server 150 receives the AuthenticateClientRequest message, the SM-DP+ server 150 may perform a validation verification process including subscription information included in the AuthenticateClientRequest message, an ICCID (indicated as ICCID1) of a profile to transfer, and signature data verification of the eUICC of the first terminal to verify eUICC installation of the first terminal of the ICCID, generate a signature of the profile server as a result of the verification, and include an authentication token including the nonce, eUICC signature data, and signature data of the profile server received in step 5b-50 in the AuthenticateClientResponse message and reply the message (step 5b-60). The corresponding reply information may additionally include an EID mapped to the ICCID. An example of the corresponding reply message may be ES9+.AuthenticateClient response (AuthResponse (AuthToken (EID, ICCID, Nonce, DP+ Signature))) (step 5b-60).

In the SM-DP+ 150 server, signature data verification of the eUICC 160 of the first terminal 300 may be signature verification using a certificate of the eUICC 160 of the first terminal 300 for data including the ICCID or additional data (ECS Nounce, eUICC signature value, processing sequence number) in the ICCID. The signature verification may be elliptic curve digital signature authentication (ECDSA). The eUICC certificate may be authenticated by the eUICC manufacturer (EUM) certificate. The EUM certificate may be verified with a certificate authority (CA) certificate possessed by the profile server 150. The CA certificate may also be referred to as a root certificate issuer (CI) certificate. Further, the validation verification process may include a process of identifying that an eUICC that was finally installed for the ICCID is the eUICC 160 of the first terminal 300 and a process of identifying the validity of the message using the message processing sequence number. Further, although the validation verification process of the profile server 150 is not illustrated in the drawing, the profile server 150 may include a process of inquiring the provider server whether to allow reinstallation of the profile for authentication of the ICCID, and replying the result. When the LPA1 510 receives the corresponding authentication token from the SM-DP+ 150 (step 5b-60), the LPA1 510 may transmit the corresponding information to the ODSA1 500, and the ODSA1 500 may reply the corresponding authentication token together with the terminal identification information to the ECS 120 (step 5b-70).

The ECS 120 may verify the validity of the nonce value initially generated (step 5b-20) and transmitted with the received authentication token, and verify the SM-DP+ signature value (step 5b-80) to perform the subsequent procedure as described above (steps 5a-190 to 5a-230), thereby completing the device transfer procedure. The nonce value generated by the ECS 120 may be used as an identifier for determining whether to reuse the nonce value for the authentication request and proving/verifying whether it is a request from the ECS 120. When the ECS 120 receives a message including a nonce value, the ECS 120 may determine the validity of the nonce value and include a process of determining that the transmitted message is a reply value to a message initially generated in the ECS and whether the nonce value is not reused and. Further, as described above, because the ECS 120 supporting the corresponding authentication stores a GSMA CI certificate as the same root CI certificate as that of the SM-DP+ server 150, the SM-DP+ signature value may be verified with the CI certificate possessed by the ECS server 120 (step 5b-80). Further, because the SM-DP+ 150 and the ECS 120 have a root CI certificate of the GSMA, and the ECS 120 is in the same GSMA certificate chain as that of the SM-DP+ 150, even if the ECS 120 does not directly interwork with the SM-DP+ 150 server, the ECS 120 may support the corresponding authentication.

FIG. 5C is a message flow diagram illustrating an embodiment in which a communication company provides an LPA method and uses LPA and SM-DP+ authentication in a first terminal (old terminal).

As described above, when the user 100 selects a profile to move from an UI of the first terminal 300 and selects a profile movement menu, the terminal may identify configuration information on a device transfer method to determine processing with the LPA method (step 5c-30). Because a procedure for identifying the configuration information on the device transfer method is the same as or similar to that described above with reference to FIG. 4, a detailed description thereof will be omitted. After performing mutual authentication with the SM-DP+ 150, the LPA1 510 may request a device transfer (step 5c-40) with a message including an ICCID and device transfer indicator of a profile to move with an ES9+.AuthenticationClientRequest message. The profile server 150 that has received the message may perform a process of inquiring whether to allow reinstallation of the profile for the ICCID to the provider server 130, and replying the result (step 5c-50). Further, the provider's policy for the profile may be notified to the profile server before the provider server starts step 5c-20 or as one of the processes in step 5c-50. In the case that the communication service provider supports the profile device transfer for the corresponding ICCID, the SM-DP+ and the provider server 130 may process the profile order, preparation, and generation (step 5c-60). The corresponding message may be an ES2+.DownloadOrder, ES2+.ConfirmOrder, or ES2+.ReleaseProfile command message. When the processing is completed (step 5c-60), the SM-DP+ 150 server may reply (step 5c-70) an ES9+.AuthenticationClientResponse message including a TransferType, ServiceProviderMesage, and additionally an activation code. The TransferType is an identifier for the provider's device transfer support method and may represent whether it is profile download through reissuance of a new activation code with the corresponding identification information or whether the terminal deletes the existing profile and generates an activation code including the information with delete notification, and whether the profile server is to verify through some or all delete notification included in an activation code generated later. The ServiceProviderMesage represents data for guiding a user about profile processing for a device transfer, and the like. In the case that the user 100 finally agrees to the device transfer procedure processing (step 5c-80), the LPA1 510 may reply, to the SM-DP+ 150, a message including the user response to the device transfer processing. As an example, the message may be an ES9+.CancelSession (end user confirmation result) (step 5c-90) message. According to the policy of the communication service provider received the message in step 5c-70, the first terminal 300 may delete the previously installed profile when moving the profile, and perform a procedure of generating and utilizing an activation code in the terminal through the deletion message (steps 5c-95 and 5c-100). Steps 5c-95 and 5c-100 procedure may be provided even in the case that a request (DeleteOldProfile) for deleting a profile is included, as in step 5a-200. The first terminal 300 may delete the profile (step 5c-95), and constitute and display a QR code using all or part of generated delete notification information (step 5c-100). When the user 100 inputs an input to delete a profile for a device transfer through local profile management (e.g., clicks an OK button in step 5d-40), the eUICC 160 may delete the profile (step 5c-95) and transfer the result message to the LPA1 510. The LPA1 510 may set a bit meaning DeleteProfile in event information (NotificationEvent) data to be received in a second control message (e.g., ES10c.ListNotificationRequest message) and transmit the message to the eUICC 160. The eUICC 160 that has received the second message may reply all notification information corresponding to the DeleteProfile to the LPA1 510. The notification includes at least one of processing sequence number information (indicated by sequence, Seq, or seqNumber) or a profile ID (or iccid or ICCID). The LPA1 510 may select a notification corresponding to the deleted profile or a Seq value and send a third control message (e.g., ES10c.RetrieveNotification message) including the Seq value to the eUICC. The eUICC 160 may transmit notification information corresponding to the Seq value among the stored notification information to the LPA1 510. The information included in the notification information may include at least one of the following information. Thereafter, the first terminal 300 may encode and display information including the information in the QR code (step 5c-100).

seqNumber: Processing sequence number information
profileManagementOperation: Delimiter indicating whether the corresponding profile has been deleted
notificationAddress: Profile server address
ICCID: Deleted Profile ID
euiccNotificationSignature: Digital signature of the eUICC 160 used for proving an ICCID of the corresponding profile, proving that the processed operation is an indicator that means deleted, and proving that the processing sequence number information is a SEQ value
eUICCCertificate: eUICC certificate used for proving the validity of the eUICC signature.
EUMCertificate: Additional certificate used for proving the validity of the eUICC certificate The QR code is information to be transmitted to the second terminal 350 for profile download and installation, and according to an embodiment of the disclosure, the second terminal 350 may finally transmit some or all of information acquired through the QR code to the profile server. The second terminal 350 may scan the QR code to initiate a profile download procedure (step 5a-230). In the case of receiving and installing an activation code issued (step 5c-70) from a provider in steps 5c-95 and 5c-100 without generating an activation code with profile delete notification in step 5a-230, the profile download procedure may be performed thereafter according to the procedure defined in GSMA SGP.22 v2. In step 5a-230, as in step 5c-95 or 5c-100, in the case that the profile is deleted and the corresponding deletion information is utilized, the second terminal 350 may transmit an InitiateAuthenticate message including an eUICCChallenge value of the eUICC to install the profile to the profile server corresponding to a profile server address included in the QR code. The profile server may verify the corresponding value to generate a Transaction ID, and generate and reply a signature of the profile server for data including the Transaction ID and eUICC-Challenge value. In this case, the InitiateAuthenticate reply message may include the profile signature value and Transaction ID. After receiving the InitiateAuthenticate reply message, the second terminal 350 may receive data including the ICCID included in the QR code and eUICC signature data of the first terminal 300, generate eUICC signature data signed by an eUICC of the second terminal 350 for the data, and include the data in the AuthenticateClientRequest message and transmit the AuthenticateClientRequest message to the profile server. When the profile server 150 receives the AuthenticateClientRequest message, by performing a validation process including an ICCID of the profile to move included in the AuthenticateClientRequest message and signature data verification of the eUICC in which the profile of the first terminal 300 is installed, the profile server 150 may determine whether to download the corresponding profile and include and reply data including ProfileMetadata corresponding to the profile in the AuthenticateClientResponse message. Further, signature data verification of the eUICC 160 of the first terminal may be signature verification using the certificate of the eUICC 160 of the first terminal 300 for data (processing sequence number, profile deletion delimiter, profile server address, deleted profile ICCID, eUICC signature value) including the ICCID and additional data. Thereafter, the second terminal 350 receives the AuthenticateClientResponse message and when the AuthenticateClientResponse message includes ProfileMetadata, the second terminal 350 may perform some or all of a process of receiving consent to receive the profile through a UI displaying to the user, a process of requesting an input of a confirmation code and receiving an input, and a process of generating an one time public key (otpk.eUICC) of the eUICC. Thereafter, when the second terminal 350 transmits the GetBoundProfilePackage Request including the otpk.eUICC to the profile server 150, the profile server may reply BoundProfilePackage including information encrypted with an encryption key generated using otpk.eUICC to the second terminal 350. Upon receiving the BoundProfilePackage, the second terminal 350 may install the profile in the eUICC of the second terminal 350 to complete all procedures.

Figure 5D:
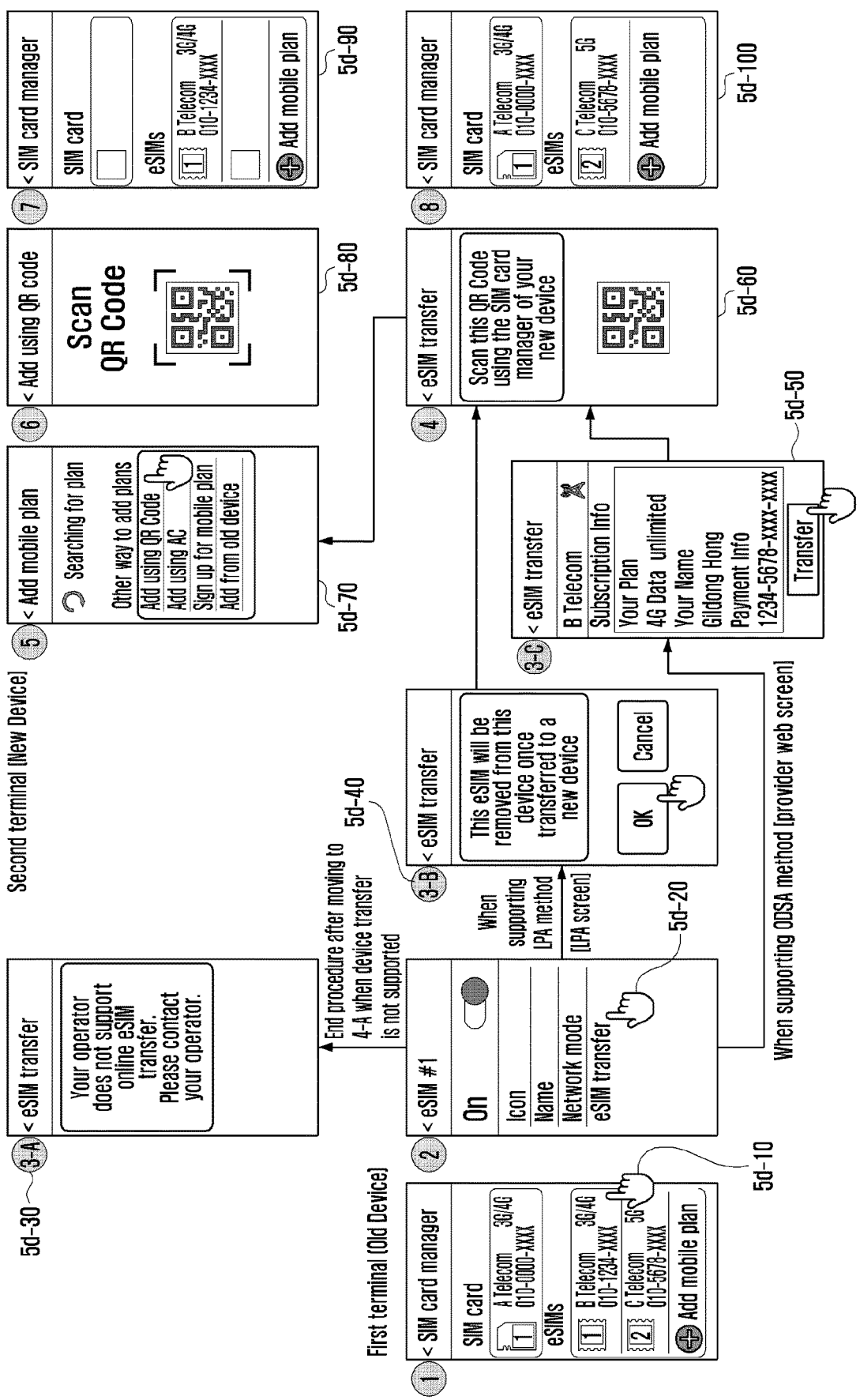
FIG. 5D is a diagram illustrating a representative processing procedure for an UI and UX for an eSIM device transfer starting in a first terminal.

FIG. 5D is a diagram illustrating a representative processing procedure for a user interface (UI) and user experience (UX) for an eSIM device transfer starting in the first terminal. FIG. 5D illustrates an example of an expected UI and UX of the user when the procedure processing of FIGS. 5A to 5C is implemented in the terminal. The order indicated by the number is the processing order of the corresponding procedure, and the order indicated by 3-A to 3-C represents a time point branched according to the device transfer method and the provider support method in processing the corresponding procedure. The user 100 may identify SIM card information currently installed in the corresponding terminal through a menu such as a terminal configuration of the first terminal 300. For example, For example, profile information stored in the SIM card and eUICC may be illustrated to the user, as illustrated in No. 1 screen. On the corresponding screen, the user may select a profile to move (step 5d-10) or select one or more profile through a separate menu (e.g., move all). When the user selects the profile to move, a separate menu list may be displayed so that the terminal may receive a command to process for the corresponding profile as in step 5d-20, and a separate menu may be provided with an identifier indicating that a device transfer is performed as one of them. The menu entry may recognize the terminal as the first terminal 300 and process in the case that the user selects a profile to move in the terminal and selects the corresponding menu in even the case of entering the same device transfer menu or processing a menu differently from the case of processing in a new terminal. In the case of selecting a device transfer for the corresponding profile, as the LPA1 510 of the first terminal 300 performs an ES10c.GetProfilesInfo( ) function call in the eUICC to bring metadata information of the profile, the LPA1 510 may identify MCC+MNC with the intrinsic identification number of the communication service provider of the profile. Further, in this case, the LPA1 510 may identify status information of the corresponding profile. The terminal may acquire the provider identification number of the profile to move by the user from the terminal without user interaction, and constitute and display No. 2 screen through predetermined information acquired through metadata of the corresponding profile along with the provider identification number. When the user 100 requests a device transfer through device transfer menu selection as in step 5d-20 of No. 2 screen, the terminal may start a procedure for acquiring provider configuration information on a device transfer, including whether and how the communication service provider supports a device transfer, as described above with reference to FIG. 4 to determine a device transfer method to be used in the terminal through metadata of the profile to move and information acquired from a separate configuration server or the memory of the terminal. When the user 100 selects the device transfer menu (step 5d-20), the first terminal 300 may display different screens according to whether and how the device transfer method is supported, as in steps 5d-30, 5d-40, and 5d-50. Step 5d-30 illustrates an example of displaying on the screen in the case that the communication company of the selected profile does not support the device transfer method. Although not specified in FIG. 5D, when the profile is selected in step 5d-10, the terminal may bring the provider's device transfer configuration information from metadata or the memory of the terminal, and in the case that there is no information on device transfer support in the corresponding information, the terminal may process not to selectively expose the device transfer menu in the menu itself in step 5d-20. In this case, only the device transfer support provider may expose the corresponding device transfer menu. Further, at a time point of step 5d-20 of entering the eSIM transfer menu, the provider may determine EAP-AKA method support information and profile status information, and notify the user that the profile should be enabled to support the EAP-AKA method. In the case that the terminal determines processing in the LPA method as a result of identifying the information acquired in steps 5d-10 and 5d-20, the first terminal 300 may process authentication through the SM-DP+, as illustrated in FIG. 5C and display a provider message preconfigured in the LPA or received through the SM-DP+ on the terminal screen. For example, as in step 5d-40, the first terminal 300 may display a message for processing user consent for deleting an existing profile for moving a corresponding profile. In the case that the terminal determines processing in the ODSA method as a result of identifying the information acquired in steps 5d-10 and 5d-20, the terminal may trigger an ODSA1 500, which is the ODSA client thereof, and when the ODSA1 500 requests a device transfer to the ECS 120 (step 5a-50), performs subscriber authentication as illustrated in FIG. 5A or 5B, and in the case that the subscriber is authenticated as a result of the subscriber authentication, the terminal may display a web screen of the provider on information for device movement processing of a communication service of the (profile) to move as in step 5d-50. The constitution of the web screen may vary according to the provider. In the case that the terminal requests a device transfer from the ODSA1 500 to the ECS 120 without an authentication identifier, the ECS 120 may select OAuth/Open ID with a subscriber authentication method, as in step 6a-140 of FIG. 6A. Further, as described above, the ECS 120 may select one method, and for example, the EAP_ID was transmitted as an identifier that requests EAP-AKA with the authentication method requested by the terminal, but the ECS that has received the EAP_ID does not process this for reasons such as not supporting a relay with an AAA server, but in the case that the ECS supports an OAuth/Open ID, the ECS may reply including the client ID and redirection URI in the initial http(s) response—302 found in order to request processing with the OAuth/Open ID.

In this case, the terminal may receive a log-in page (i.e., redirection URI) requesting an input of the user's ID and password from the ECS 120 and display the log-in page on the user's screen (step 6c-70) to process subscriber authentication with the ID and password, and then move to the same screen as that of step 5d-50. In the case that the EAP-AKA method or the ECS&DP+ authentication method is determined through a terminal configuration, user selection, or ECS selection, as described above, the user may complete a subscriber authentication process without interaction in the terminal UI such as ID generation. When subscriber authentication is completed by changing the device with the LPA or ODSA method, the first terminal 300 may generate an activation code and provide the activation code together with a method of acquiring the activation code from the second terminal 350 (step 5d-60). Although a method of providing the activation code in the form of a QR code is illustrated in step 5d-60, activation code information may be transmitted through an inter-terminal transmission protocol. The user 100 may input activation code information into the LPA2 530 of the second terminal 350 through the method provided in (step 5d-60) (steps 5d-70 and 5d-80). When the corresponding information is input, the second terminal 350 may download and install the profile, as described above in step 5a-230, and when downloading and installation of the profile is completed, the user may identify that reinstallation of the profile has been completed in the first terminal 300, as in the example of step 5d-90. As in step 5d-100, the profile in which the device transfer processing has been completed is deleted from the profile list of the first terminal 300 according to the provider's policy of the first terminal 300 and the user's consent for the deletion process; thus, the profile may be processed not to be no longer exposed to the user.

Figure 6A:
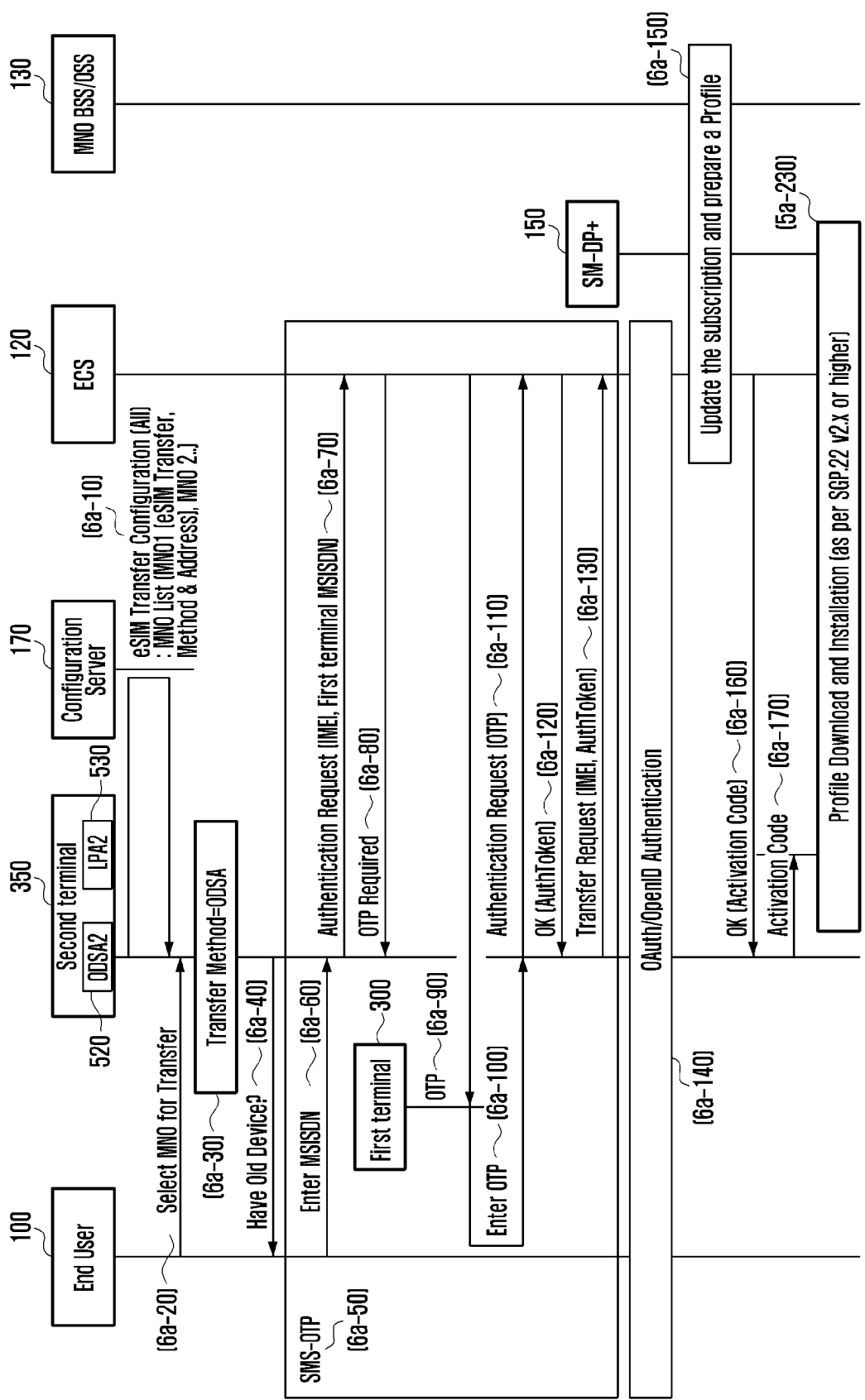
FIG. 6A is a message flow diagram illustrating an embodiment in which a communication company provides an ODSA method and uses OTP or OAuth/Open ID authentication.
Figure 6B:
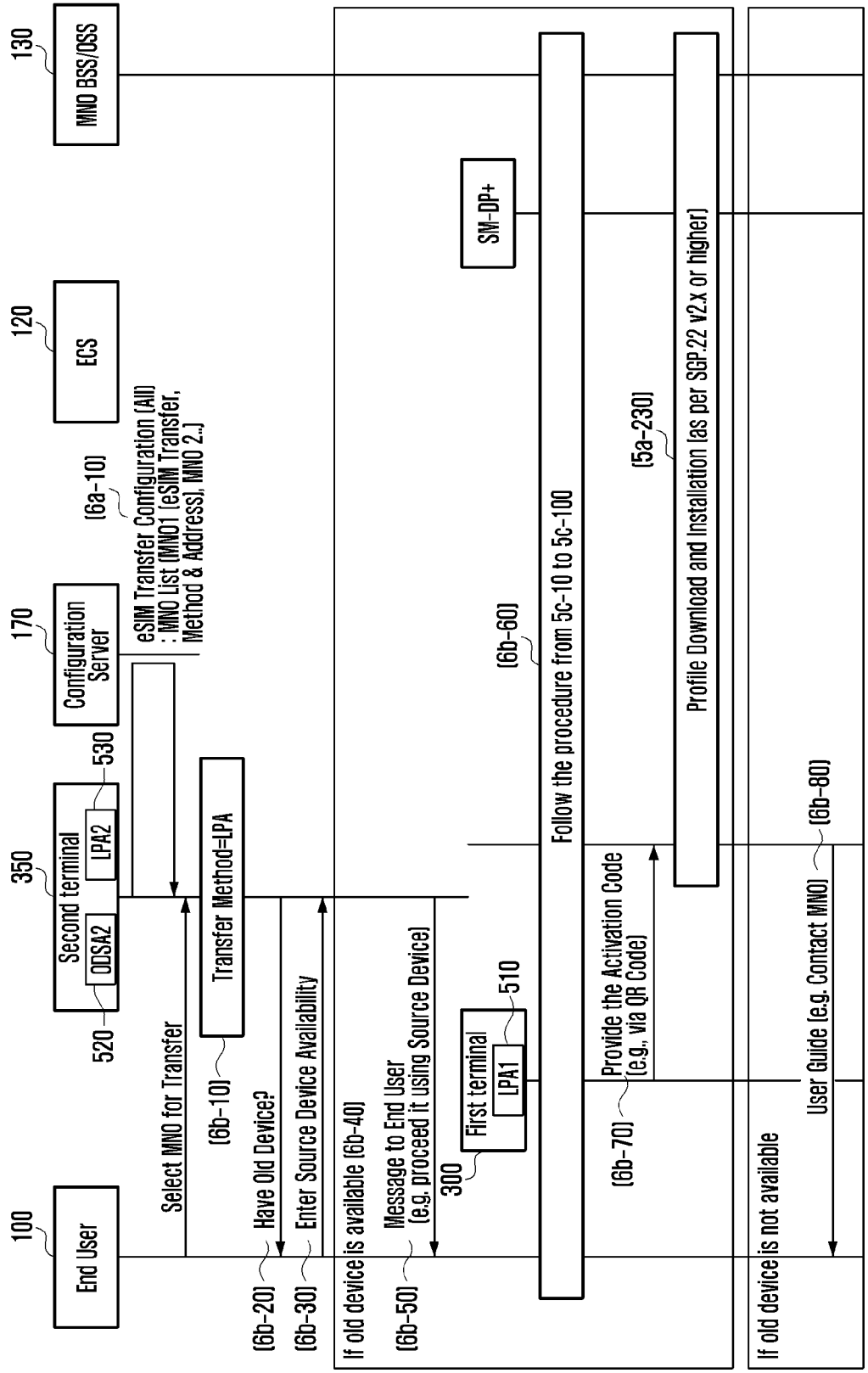
FIG. 6B is a message flow diagram illustrating an embodiment in which a communication company provides an LPA method and uses LPA and SM-DP+ authentication in a first terminal (old terminal).
Figure 6C:
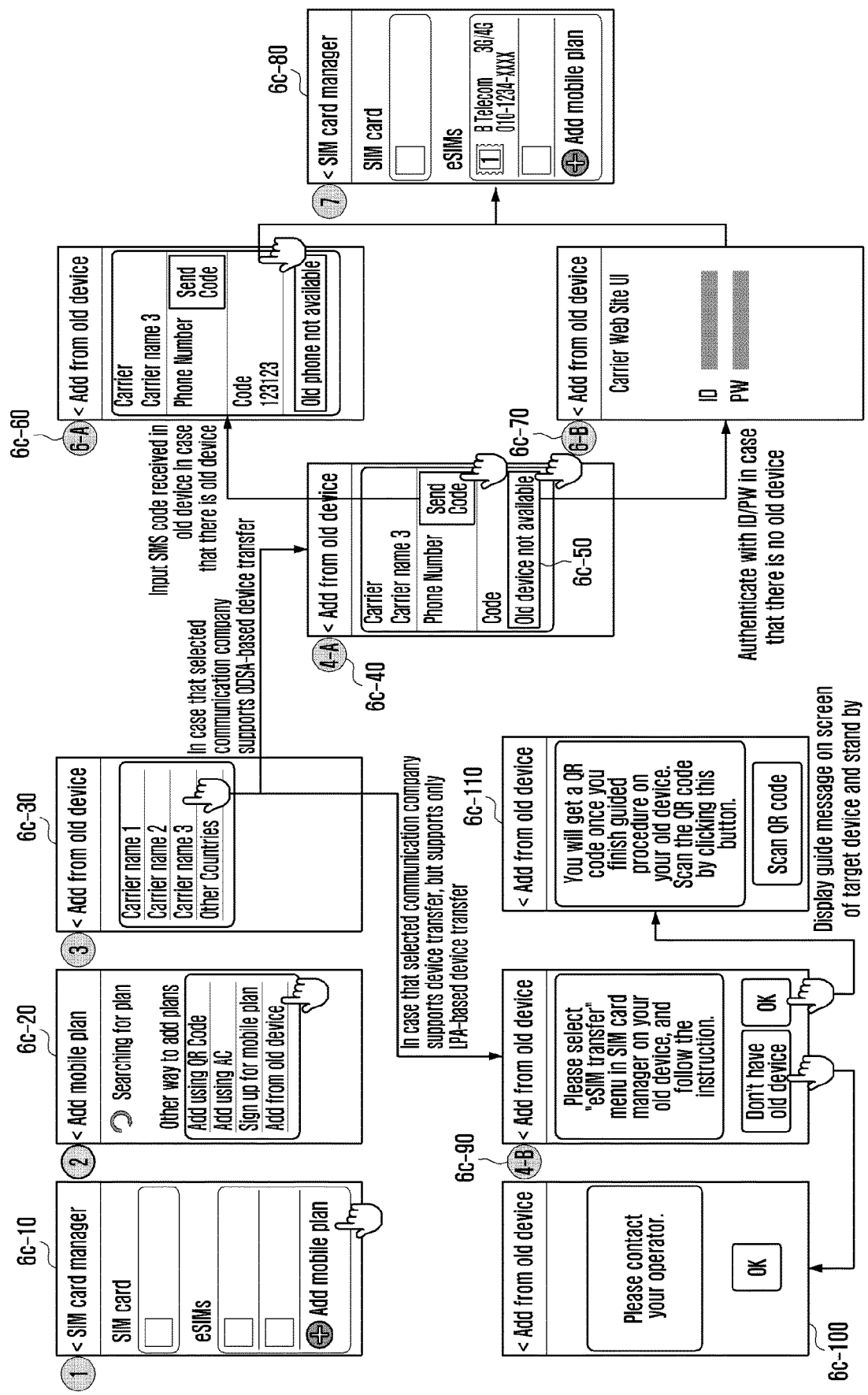
FIG. 6C is a diagram illustrating a representative processing procedure for an UI and UX for an eSIM device transfer starting in a second terminal.

FIGS. 6A to 6C are diagrams illustrating procedures in which a user initiates a device transfer in a second terminal (new terminal). FIG. 6A is a message flow diagram illustrating an embodiment in which a communication company provides an ODSA method and uses OTP or OAuth/Open ID authentication. The end user 100 may select a communication company for a user to change a device in the second terminal 350, and the terminal acquires configuration information, as described with reference to FIG. 4 (step 6a-30); thus, the terminal may determine subsequent device transfer processing in the ODSA method (steps 6a-30). Because the detailed method for acquiring configuration information has been described with reference to FIG. 4, an additional description will be omitted here. The second terminal 350 may generate and display a menu indicating whether there is a user-owned terminal capable of receiving an SMS (step 6a-40), and in the case that the user 100 may receive an authentication code through the existing terminal 300, the user may input a subscriber phone number, that is, MSISDN, which is an intrinsic number for identifying a subscriber in the mobile network on the screen (step 6a-60). Although not specified above, messages are exchanged between the ODSA 110 and the ECS 120 of the terminal using an HTTP(s)-based mechanism. The ODSA2 520 of the second terminal 350 that has received the input may transmit an authentication request Https Request message including the IMEI of the requesting terminal 350 and the MSISDN of the first terminal 300 to the ECS 120 (step 6a-70). The ECS 120 that has received the message parses the message, and in case that there is an MSISDN value, the ECS 120 may transmit the OTP to the phone number (MSISDN) provided by the end user 100 (step 6a-90) and include a cookie in HTTP(S) 200 OK and transmit the HTTP(S) 200 OK to the ODSA2 520 (step 6a-80). The ODSA2 520 may reply a new get request to the ECS 120 (step 6a-110), including OTP parameters received and input by the end user 100 through the first terminal 300 and a cookie received from the previous HTTP 200 OK response. The ECS 120 may verify the received OTP, generate a new authentication token (AuthToken), and reply the new authentication token (AuthToken) to the ODSA2 520 (step 6a-120). Thereafter, the ODSA2 520 may request the ECS 120 to change the device, including the corresponding authentication token (step 6a-130). As described above, in order to acquire device transfer configuration information for profile installation for device transfer processing and to verify a service state of the terminal, when the ODSA 110 transmits an HTTP(s) request to the ECS 120, the ECS 120 may process the request and reply a result value to the ODSA 110. In the case that the received Get request does not include EAP_ID, DP+AuthSupport, or MSISDN or that it is indicated that the corresponding or other authentication means provided by the terminal is not available, the ECS 120 may request OAuth/Open ID authentication (step 6a-140) to the terminal.

The following describes in more detail a method of performing OAuth/Open Id authentication (step 6a-100). In the case of starting in the second terminal 350, because the existing terminal 300 is unavailable (step 6a-40), when the ECS 120 does not receive MSISDN information, the ECS 120 does not have an available authentication means; thus the ECS 120 may reply "302 Found" as a response for retransmitting the received GET request from the ODSA client of the terminal to the authentication server of the service provider. As described above, the ECS 120 may transmit an URL address of an authentication point to be redirected for open ID processing to the corresponding "302 Found" as a location value of the header. Further, as a body message of "302 Found", the ECS 120 may include "openid" as a value of a scope along with a response type=code and reply the response type=code along with scope=openid. 'openid' is one of the possible values of the Scope parameter, and may indicate that the application wants to use the open ID Connect standard protocol for user identification. Response type=code may be used as an identifier indicating that the code should be replied from the authentication server indicated in the location.

The open ID authentication server (authentication point to be redirected) may select an authentication method (additional SMS authentication, and the like) according to the policy of the service provider to authenticate the user 100, and reply a code value as a result thereof. Here, the OAuth2.0 authentication code (temporary code provided for exchange with an access token) may be replied to the terminal. The terminal includes the corresponding authentication code as a reply value for "302 Found" and transmits it to the ECS 120. When the ECS 120 receives the corresponding authentication code, the ECS 120 may transmit the corresponding authentication code to the open ID authentication server to request an access token and an ID token. When the open ID authentication server verifies and approves the OAuth2.0 authentication code, the open ID authentication server may reply an access token and an ID token to the ECS 120. The ECS 120 may identify subscriber information of the corresponding user with the corresponding token values, resume an original GET resource request, and perform a subsequent procedure for a device transfer. Because the procedure for updating subscriber information and generating a profile for a communication service of a subscriber between the ECS 120, the SM-DP+ 150, and the MNO BSS/OSS 130 has been previously described with reference to FIG. 5A, a detailed description thereof will be omitted. After processing the corresponding procedure, the ECS 120 receives an activation code as predetermined information required for downloading the corresponding profile from the MNO BSS/OSS 130 or the SM-DP+ 150 and transmits the activation code to the ODSA2 520, and the ODSA2 520 transmits activation code information to the LPA2 530 through the LPA API; thus, the LPA2 530 may trigger profile download in the SM-DP+ 150 to complete a process of downloading and installing the profile according to the procedure defined in GSMA SGP.22 (step 5*a*-230).

FIG. 6B is a message flow diagram illustrating an embodiment in which a communication company provides an LPA method and uses LPA and SM-DP+ authentication in a first terminal (old terminal).

As described above with reference to FIG. 5A, the end user 100 may select a communication company in which the user is to perform a device transfer in a second terminal, and the terminal may acquire configuration information, as described with reference to FIG. 4 to identify that the provider's device transfer method is an LPA method through the combination. In this case, the terminal may determine and proceed the process (step 6*b*-10) in the LPA method. At a current time point that the second terminal 350 initiates the disclosure, because there is no method capable of processing the LPA method, the terminal may display a message identifying whether the existing terminal is available for the user on a screen of the second terminal 350 (step 6*b*-20). Because an LPA-based device transfer method may be provided irrespective of profile status information of the existing terminal, the message on whether the existing terminal is used in step 6*b*-20 may be processed differently from step 6*a*-40. For example, the message in step 6*a*-40 may identify together whether the existing terminal is available and whether the terminal is a terminal capable of receiving an SMS, but in step 6*b*-20, only whether the existing terminal is available may be identified and processed. In the case that the user inputs that the first terminal 300 is available in the second terminal 350 (step 6*b*-30), the second terminal 350 may enable the first terminal 300 to perform a device transfer procedure through an LPA procedure, as in step 6*b*-40. As an example, after generating and displaying a guide message to proceed (step 6*b*-50) with a procedure of steps 5*c*-10 to 5*c*-100 of FIG. 5C are displayed in the first terminal 300 on the screen of the second terminal 350 so that the user 100 may proceed the subsequent procedure in the first terminal 300, the screen of the second terminal 350 may move to a screen of the LPA2 530 for receiving the activation code and stand by. UI/UX for the corresponding processing will be described later with reference to FIG. 6C. As described above with reference to FIG. 5C, when the user 100 processes the LPA-based device transfer in the first terminal 300, receives (step 5*c*-70) or generates (step 5*c*-100) an activation code, and displays the activation code on the screen, the second terminal 350 may receive an input of the corresponding information through the displayed activation code scan (step 5*c*-110) through a camera in the LPA2 530, access an SM-DP+ server address extracted from the activation code, and download the profile and complete installation of the profile. In case that the terminal receives an input of the user that there is no first terminal 300 (step 6*b*-30), the terminal may display a user guide message to inquire to a communication service provider (step 6*b*-50) and end all procedures.

FIG. 6C is a diagram illustrating a representative processing procedure for an UI and UX for an eSIM device transfer starting in a second terminal. FIG. 6C is a diagram representatively illustrating UI/UX implemented in FIGS. 6A and 6B as a case in which the user starts a device transfer in the second terminal 350. (4-A, 4-B) and (6-A, 6-B) on a mobile phone screen in a scenario starting in the second terminal 350 represent a representative branching time point. When the user enters a menu for a device transfer in the second terminal 350 (step 6*c*-20), the terminal may collect provider configuration information on the device transfer and display the provider configuration information on the screen (step 6-30), as described above with reference to FIG. 4. For example, the terminal may list all communication service provider information acquired using the configuration server (option 2 and option 3 of FIG. 4) or through information (option 4 of FIG. 4) stored in the memory or extract only a provider that can provide a device transfer in the corresponding region by additionally combining location information of the terminal, and the like with the corresponding information, and then expose a list of the providers on the screen. As another example, when the user 100 provides information on the communication service provider to move the profile, as in option 2 of FIG. 4, the terminal may identify a selected communication service provider name or MCC+ MNC of the communication service provider in the memory in the terminal or the configuration server and selectively display only information of the mapped provider. In this case, in the case that the provider does not support a device transfer, although it is not illustrated in FIG. 6C, the terminal may display a separate guide message on the screen and end the procedure without entering step 6*c*-40 or step 6*c*-90 after step 6*c*-30. When the user 100 selects a provider in step 6*c*-30, the terminal may process by branching to the screen of step 6*c*-40 or 6*c*-90 according to an identified device transfer support method of the provider. Processing in step 6*c*-40 is the case that the selected communication service provider supports an ODSA-based device transfer, and the terminal provides an additional menu on whether there is the existing terminal as in step 6*c*-50, and is connected to an SMS-OTP authentication progress screen (step 6*c*-60) provided in the terminal or an URL in a location header received from the ECS 120 through 302 found http(s) response according to the user's response to display the provider providing screen (step 6*c*-70). When subscriber authentication is completed according to the corresponding authentication method, a communication service subscription app or web portal of the second terminal 350 receives activation code information, and transfers the corresponding activation code information to the LPA2 530 through the LPA API, and when the LPA2 530 that has received the corresponding activation code information completes all processing/installation of the profile download, the LPA2 530 may display to the user 100 that a profile to move has been installed, as in step 6*c*-80. In case that the device transfer support method of the provider determined by the terminal through step 6*c*-30 is the LPA method, the second terminal 350 may notify that a process is changed according to whether there is the existing terminal 300 as in step 6*c*-90, and in case that the existing terminal 300 is unavailable, the second terminal 350 may display a provider contact message as in step 6*c*-100 and end all procedures. In the case that the second terminal 350 responds that the existing terminal 300 is available, the second terminal 350 may generate an additional guide message to guide the user to process in the first terminal 300, and an activation code such as a scan QR code may standby in the procedure for input (step 6*c*-110). In the case that the user's response (e.g., activation code input) does not occur during a predetermined time period through a timer according to a configuration of the terminal, the terminal may display a user guide message and end a device transfer procedure or may extend standby. When the user proceeds to change the device according to the LPA processing procedure in the first terminal 300 in FIG. 5D and receives issue of an activation code, the user may process the subsequent procedure of FIG. 5D to complete the device transfer through menu selection for receiving the activation code in the second terminal 350, as in the example of step 6c-110.

Figure 7:
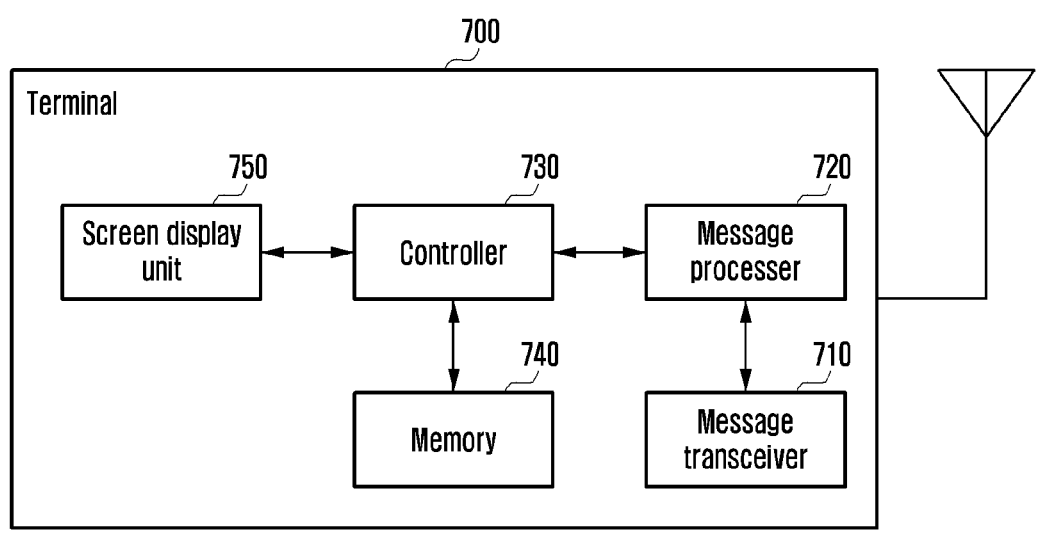
FIG. 7 is a block diagram illustrating a block constitution of a terminal in a wireless communication system according to an embodiment of the disclosure.

FIG. 7 is a block diagram illustrating a block constitution of a terminal in a wireless communication system according to an embodiment of the disclosure.

With reference to FIG. 7, a terminal 700 includes a transceiver 710, a message processer 720, a processor (controller) 730, a memory 740, and a screen display unit 750. However, the components of the terminal 700 are not limited to the above-described example. For example, the base station may include more or fewer components than the foregoing components. Further, at least one component of the terminal 700 may be implemented in the form of one chip. According to some embodiments, the transceiver 710 may perform a function for transmitting and receiving a signal through a wireless channel, such as band conversion and amplification of a signal. That is, the transceiver 710 may include an RF processor that up-converts a baseband signal into an RF band signal, transmits the RF band signal through an antenna, and down-converts an RF band signal received through the antenna into a baseband signal, and further include a transmission filter, a reception filter, an amplifier, a mixer, an oscillator, a digital to analog converter (DAC), and an analog to digital converter (ADC).

Further, the transceiver 710 may receive a signal through a wireless channel, output the signal to the processor 730, and transmit the signal output from the processor 730 through a wireless channel. Although only one antenna is illustrated in FIG. 7, the terminal may include a plurality of antennas. Further, the transceiver 710 may include a plurality of RF chains.

The transceiver 710 may perform beamforming. For beamforming, the transceiver 710 may adjust a phase and magnitude of each of signals transmitted and received through a plurality of antennas or antenna elements. Further, a baseband processer in the transceiver 710 may perform a conversion function between a baseband signal and a bit string according to a physical layer specification of a system. For example, when transmitting data, the baseband processer may encode and modulate a transmitted bit string, thereby generating complex symbols. Further, when receiving data, the baseband processer may demodulate and decode the baseband signal provided from the RF processor, thereby restoring a received bit string. For example, in the case of following an orthogonal frequency division multiplexing (OFDM) method, when transmitting data, the baseband processer may encode and modulate the transmission bit string to generate complex symbols, map the complex symbols to subcarriers, and then constitute OFDM symbols through an inverse fast Fourier transform (IFFT) operation and cyclic prefix (CP) insertion.

Further, when receiving data, the baseband processor may divide the baseband signal provided from the RF processor into OFDM symbol units, restore signals mapped to subcarriers through a fast Fourier transform (FFT) operation, and then restore the received bit string through demodulation and decoding.

The transceiver 710 may be defined as a transceiver and include a message transceiver. The message processer 720 may perform an operation of determining what kind of message data transmitted or received through the transceiver 710 is. For example, the message processer 720 may determine whether the received message is a radio resource control (RRC) layer control message (including a system information block (SIB)) or a user data message. The message processer 720 may be included in the controller 730.

The controller 730 controls overall operations of the terminal 700. For example, the controller 730 may transmit and receive a signal through the message processer 720. Further, the controller 730 writes and reads data in the memory 740. The controller 730 may be at least one. For example, the controller 730 may include a communication processor (CP) that controls for communication and an application processor (AP) that controls an upper layer such as an application program. According to some embodiments, in the case that there is provider configuration information on a device transfer stored in advance in the memory 740, the controller 730 may request the information to the memory 740 to control the screen display unit 750 to display the information or may receive the information to perform additional operations.

The controller 730, the message processer 720, and the transceiver 710 may control the terminal 700 to access a selected provider network according to the user or terminal configuration. Further, according to some embodiments, the controller 730 may perform a process in which the terminal infers information that may be referred to in selecting a service by matching data record read through the memory 740 or information collected through the controller 730, the message processer 720, and the transceiver 710. According to some embodiments, the controller 730 may determine whether user consent is required for specific information stored in the terminal 700, and display it on the screen display unit 750.

Further, the controller 730 may control the terminal 700 to perform a corresponding operation. According to some embodiments, the controller 730 may include an LPA in charge of driving and controlling an eUICC, an ODSA client for communication service subscription and device transfer processing, an LPA, or ODSA client, or an application in which the two are integrated. Further, the controller 730 may acquire predetermined information required for a device transfer through the memory 740, determine whether an LPA or ODSA client operation is necessary for a communication service device transfer, and process subsequent processes. Further, the controller 730 may acquire device transfer information that may be provided by a communication service provider collected through the message processer 720 and the transceiver 710, combine the device transfer information with device transfer additional information identified through the memory 740 of the terminal 700 and profile status information acquired through the controller 730, and control the terminal 700 with a method to be processed among LPA and ODSA device transfer methods and an authentication method to be applied.

The controller 730 may combine terminal capability information acquired from the message processer 720, the transceiver 710, and the memory 740, device transfer method information of the provider, and predetermined information input in the screen display unit 750 to determine whether the terminal is to support a profile movement, and in the case that the terminal supports profile movement, the controller 730 may determine whether to perform the role of a first terminal or a second terminal and whether to proceed with which device transfer method procedure.

The controller 730 may transmit a request for securing information on whether the provider supports a device transfer, a support method and a configuration server address to be connected for support, an ECS or DP+ server address, or a supporting subscriber authentication method, and the like to the memory 740 to control the terminal 700 to process the request. According to some embodiments, the controller 730 may receive device transfer configuration information in addition to an authentication method support capability of the terminal from the memory 740, and transmit information to the ECS server through the message processor 720 and the message transceiver 710 or may select a specific parameter and transmit information through the message processor 720 and the message transceiver 710. Further, in the case that the processor 730 determines that the terminal does not provide an EAP-AKA function at the corresponding time point (e.g., in the case that the profile is deactivated), the processor 730 may control the terminal 700 to limit an operation for EAP-AKA processing.

The memory 740 stores data such as a basic program, an application program, and configuration information for the operation of the terminal 700. The memory 740 may include an UICC, eUICC, iSSP, and iUICC, which are hardware security modules embedded in the terminal. In the embodiment, the memory 740 may be formed with a storage medium such as a ROM, RAM, hard disk, CD-ROM, and DVD or a combination of storage media and provide stored data such as a transfer configuration according to the request of the controller 730. Further, the memory 740 may be integrated with the controller 730 and a system on chip (SoC).

The screen display unit 750 may display information processed by the controller 730 or may display a process of an operation performed by the terminal 700 through processing of the controller 730 or consent on an event requesting the user to perform. According to some embodiments, the screen display unit 750 may reply and display stored profile information, a movement menu between profile devices, and input and input results for an activation code to the user. According to some embodiments, the LPA or ODSA application or an application in which the two are integrated may include a screen display unit 750 and a controller 730. The disclosure is not limited to the above example.

In the specific embodiments of the disclosure described above, components included in the disclosure were expressed in the singular or plural according to the presented specific embodiments. However, the singular or plural expression is appropriately selected for a situation presented for convenience of description, and the disclosure is not limited to the singular or plural components, and even if a component is represented in the plural, it may be formed with the singular, or even if a component is represented in the singular, it may be formed with the plural.

In the detailed description of the disclosure, although specific embodiments have been described, various modifications are possible without departing from the scope of the disclosure. Therefore, the scope of the disclosure should not be limited to the described embodiments and should be defined by the claims described below as well as by those equivalent to the claims.

The invention claimed is:

1. A method performed by a terminal in a wireless communication system, the method comprising:
transmitting, to a server, a first message including a terminal identifier and an extensible authentication protocol (EAP) identifier (ID);
receiving, from the server, a second message including an authentication token associated with an extensible authentication protocol for 3rd Generation authentication and key agreement (EAP-AKA) authentication after performing the EAP-AKA authentication with an authentication server;
transmitting, to the server, a third message requesting a subscription transfer, wherein the third message includes the terminal identifier and the authentication token; and
receiving, from the server, in response to the third message, a fourth message including an activation code.

2. The method of claim 1, wherein the third message further includes an old terminal identifier indicating that the requesting is from an old terminal.

3. The method of claim 1, further comprising:
informing a new terminal to download a profile by using Quick Response (OR) code scanning.

4. A method performed by a server in a wireless communication system, the method comprising:
receiving, from a terminal, a first message including a terminal identifier and an extensible authentication protocol (EAP) identifier (ID);
transmitting, to the terminal, a second message including an authentication token associated with an extensible authentication protocol for 3rd generation authentication and key agreement (EAP-AKA), authentication after performing the EAP-AKA authentication with an authentication server;
receiving, from the terminal, a third message requesting a subscription transfer, wherein the third message includes the terminal identifier and the authentication token; and
transmitting, to the terminal, in response to the third message, a fourth message including an activation code.

5. The method of claim 4, wherein the third message further includes an old terminal identifier indicating that the requesting is from an old terminal.

6. The method of claim 4, further comprising:
receiving, from the authentication server, an EAP challenge.

7. A terminal, comprising:
a transceiver configured to transmit and receive at least one signal; and
a controller coupled to the transceiver,
wherein the controller is configured to:
transmit, to a server, a first message including a terminal identifier and an extensible authentication protocol (EAP) identifier (ID),
receive, from the server, a second message including an authentication token associated with an extensible authentication protocol for 3rd Generation authentication and key agreement (EAP-AKA) authentication after performing the EAP-AKA authentication with an authentication server,
transmit, to the server, a third message requesting a subscription transfer, wherein the third message includes the terminal identifier and the authentication, and
receive, from the server, in response to the third message, a fourth message including an activation code.

8. The terminal of claim 7, wherein the third message further includes an old terminal identifier indicating that the requesting is from an old terminal.

9. The terminal of claim 7, wherein the controller further configured to inform a new terminal to download a profile by using Quick Response (OR) code scanning.

10. A server, comprising:
a transceiver configured to transmit and receive at least one signal; and
a controller coupled to the transceiver,
wherein the controller is configured to:
  receive, from a terminal, a first message including a terminal identifier and an extensible authentication protocol (EAP) identifier (ID);
  transmit, to the terminal, a second message including an authentication token associated with an extensible authentication protocol for 3rd generation authentication and key agreement (EAP-AKA), authentication after performing the EAP-AKA authentication with an authentication server;
  receive, from the terminal, a third message requesting a subscription transfer, wherein the third message includes the terminal identifier and the authentication token; and
  transmit, to the terminal, in response to the third message, a fourth message including an activation code.

11. The server of claim 10, wherein the controller further configured to receive, from the authentication server, an EAP challenge.

12. The server of claim 10, wherein the third message further includes an old terminal identifier indicating that the requesting is from an old terminal.

* * * * *